US010657956B2

(12) United States Patent
Nakagawa et al.

(10) Patent No.: US 10,657,956 B2
(45) Date of Patent: May 19, 2020

(54) INFORMATION PROCESSING DEVICE AND INFORMATION PROCESSING METHOD

(71) Applicant: SONY CORPORATION, Tokyo (JP)

(72) Inventors: Yusuke Nakagawa, Kanagawa (JP); Shinichi Kawano, Tokyo (JP); Yuhei Taki, Kanagawa (JP); Ayumi Kato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/091,286

(22) PCT Filed: Mar. 28, 2017

(86) PCT No.: PCT/JP2017/012692
§ 371 (c)(1),
(2) Date: Oct. 4, 2018

(87) PCT Pub. No.: WO2017/221501
PCT Pub. Date: Dec. 28, 2017

(65) Prior Publication Data
US 2019/0122658 A1    Apr. 25, 2019

(30) Foreign Application Priority Data
Jun. 23, 2016  (JP) .................................. 2016-124092

(51) Int. Cl.
*G10L 15/18*     (2013.01)
*G10L 15/22*     (2006.01)
(Continued)

(52) U.S. Cl.
CPC .......... *G10L 15/1815* (2013.01); *G10L 15/10* (2013.01); *G10L 15/22* (2013.01); *G10L 15/28* (2013.01); *G10L 25/51* (2013.01)

(58) Field of Classification Search
CPC ..... G10L 15/1815; G10L 15/22; G10L 15/28; G10L 15/10; G10L 25/51
(Continued)

(56) References Cited

U.S. PATENT DOCUMENTS

| 6,581,033 B1* | 6/2003 | Reynar .................. G10L 15/22 704/231 |
| 2004/0125396 A1* | 7/2004 | Burke ................ H04N 1/00129 358/1.13 |

(Continued)

FOREIGN PATENT DOCUMENTS

| EP | 2339576 A2 | 6/2011 |
| JP | H05-172619 A | 7/1993 |
| WO | WO 00/10101 A1 | 2/2000 |

OTHER PUBLICATIONS

Jul. 2, 2019, European Search Report issued for related EP Application No. 17814973.8.

*Primary Examiner* — Edwin S Leland, III
(74) *Attorney, Agent, or Firm* — Paratus Law Group, PLLC

(57) ABSTRACT

There is provided an information processing device to further improve the operability of user interfaces that use a voice as an input, the information processing device including: an acquiring unit configured to acquire context information in a period related to collection of a voice; and a control unit configured to cause a predetermined output unit to output output information related to the collection of the voice in a mode corresponding to the acquired context information.

20 Claims, 18 Drawing Sheets

(51) Int. Cl.
*G10L 15/28* (2013.01)
*G10L 25/51* (2013.01)
*G10L 15/10* (2006.01)

(58) Field of Classification Search
USPC .......................................................... 704/235
See application file for complete search history.

(56) References Cited

U.S. PATENT DOCUMENTS

| | | | |
|---|---|---|---|
| 2005/0043954 A1* | 2/2005 | Roth | G10L 15/19 704/275 |
| 2009/0182562 A1* | 7/2009 | Caire | G01C 21/3608 704/275 |
| 2014/0195247 A1* | 7/2014 | Parkinson | G10L 15/22 704/275 |
| 2014/0237367 A1* | 8/2014 | Jung | G06F 3/167 715/728 |
| 2014/0304606 A1* | 10/2014 | Ohmura | G06F 3/167 715/728 |
| 2018/0012600 A1* | 1/2018 | Arikawa | G10L 15/183 |
| 2019/0310757 A1* | 10/2019 | Lee | H04L 67/18 |

* cited by examiner

FIG. 6
| | ACCURACY-EMPHASIZED MODE | ACCURACY-EMPHASIZED MODE |
|---|---|---|
| EXPRESSION OF VISUAL FEEDBACK BY COLOR | 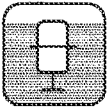 | 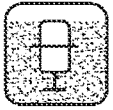 |
| EXPRESSION OF VISUAL FEEDBACK BY FORM | 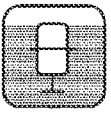 | 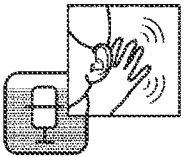 |
| EXPRESSION BY WORDS (EXPRESSION BY VOICE OUTPUT) | お話しください<br><br>Speak now | ゆっくりお話しください<br><br>Speak more slowly |
| EXPRESSION BY SOUND FEEDBACK | PIPIPIPI | PIT...PIT... |

FIG. 8
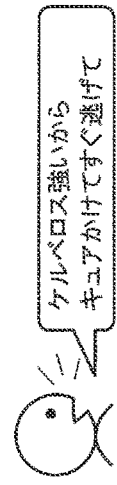 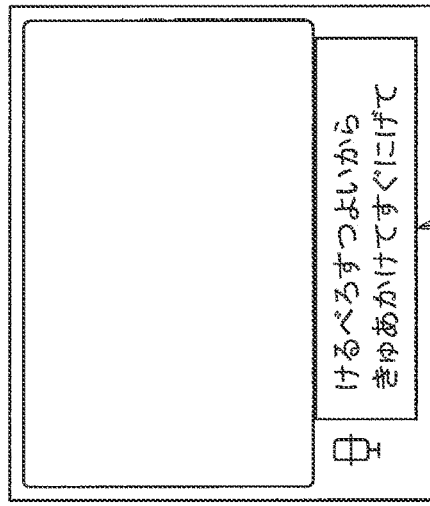
HARDLY PLAYING GAME
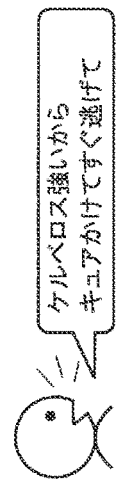 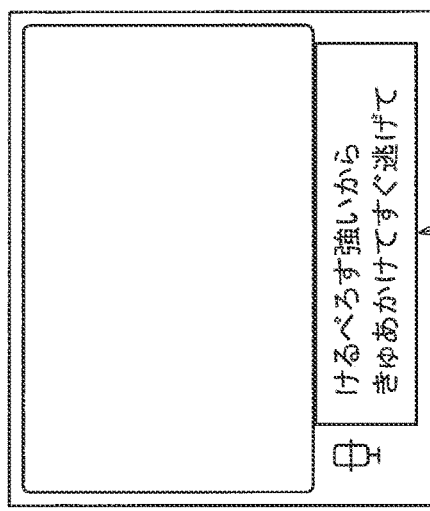
LITTLE CRAZY ABOUT GAME
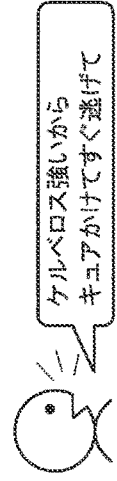 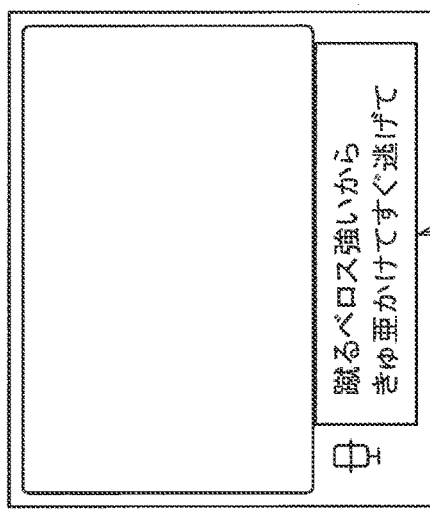
CRAZY ABOUT GAME "けるべろす"強いから
"きゅあ"かけてすぐ逃げて    ~V211d けるべろす 強いから
きゅあ かけてすぐ逃げて    ~V211e けるべろす 強いから
きゅあかけてすぐ逃げて    ~V211f けるべろす　強いから
きゅあ　かけてすぐ逃げて    ~V211g I got a rare items.

I got a rare item.
Original Form

FIG. 17
OUTPUT OF DATA FROM SOUND MODEL
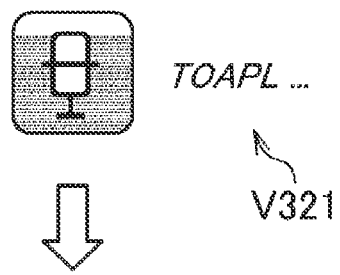
*TOAPL ...*
V321
OUTPUT OF INTERIM RESULT
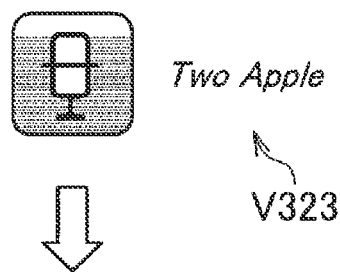
*Two Apple*
V323
OUTPUT OF FINAL RESULT
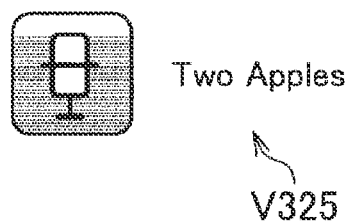
Two Apples
V325

FIG. 18
OUTPUT OF DATA FROM SOUND MODEL
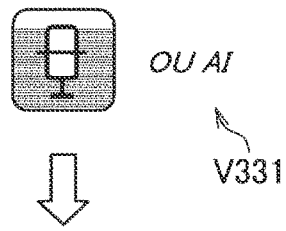
V331
OUTPUT OF INTERIM RESULT
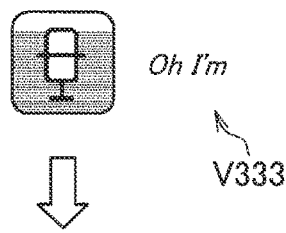
V333
PRESENTATION OF INTERIM RESULT AND OUTPUT OF DATA FROM SOUND MODEL
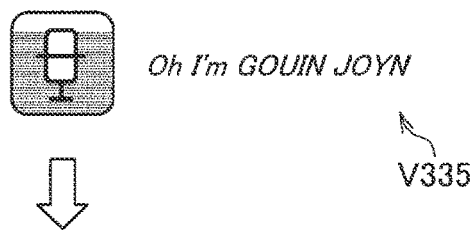
V335
OUTPUT OF UPDATED INTERIM RESULT
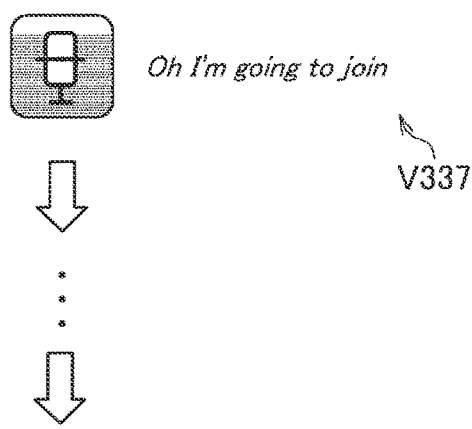
V337
OUTPUT OF FINAL RESULT
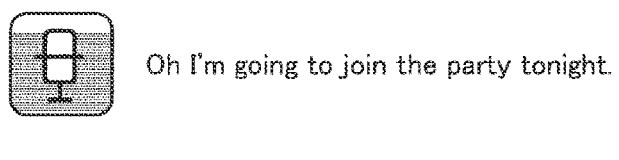
V339

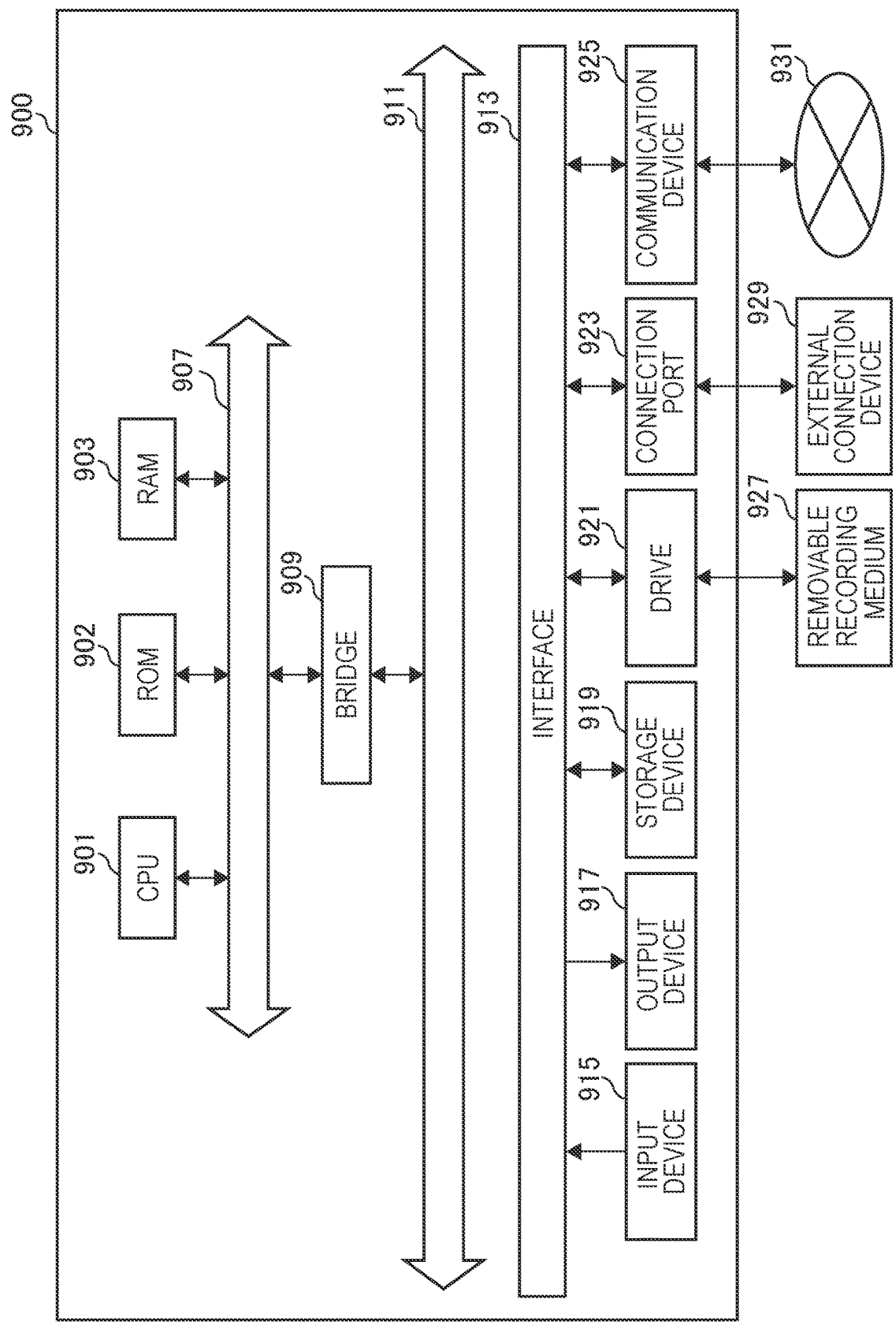

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2017/012692 (filed on Mar. 28, 2017) under 35 U.S.C. § 371, which claims priority to Japanese Patent Application No. 2016-124092 (filed on Jun. 23, 2016), which are all hereby incorporated by reference in their entirety.

TECHNICAL FIELD

The present disclosure relates to an information processing device and an information processing method.

BACKGROUND ART

Interfaces of various schemes have been proposed as input interfaces for acquiring an input from users to control operations of so-called information processing devices such as personal computers (PCs) and game machines. Particularly in recent years, as so-called voice recognition technology and natural language processing technology has developed, user interfaces (UIs) that enable users to input various kinds of information through a voice have become widespread. Patent Literature 1, for example, discloses an example of a mechanism using a so-called voice recognition technology.

A voice input by a user can be converted into, for example, so-called character information and presented by applying the above-described voice recognition technology and natural language processing technology thereto. In addition, the character information resulting from the conversion of the voice can also be applied as an input to various kinds of control, for example, when the semantic content of the character information is recognized.

CITATION LIST

Patent Literature

Patent Literature 1: JP 2004-294946A

DISCLOSURE OF INVENTION

Technical Problem

However, user interfaces that can use a voice as an input can also be applied to information processing devices with so-called limited input interfaces, such as wearable terminals, and their applications are diverse. Under such circumstances, improvement in the operability of user interfaces that use a voice as an input has been desired particularly in recent years.

Therefore, the present disclosure proposes an information processing device and an information processing method that can further improve the operability of user interfaces that use a voice as an input.

Solution to Problem

According to the present disclosure, there is provided an information processing device, including: an acquiring unit configured to acquire context information in a period related to collection of a voice; and a control unit configured to cause a predetermined output unit to output output information related to the collection of the voice in a mode corresponding to the acquired context information.

In addition, according to the present disclosure, there is provided an information processing device, including: a transmitting unit configured to transmit context information in a period related to collection of a voice acquired by a predetermined acquiring unit to an external device; and an output unit configured to present output information related to the collection of the voice transmitted from the external device in a mode corresponding to the context information.

In addition, according to the present disclosure, there is provided an information processing method, including, by a computer system: acquiring context information in a period related to collection of a voice; and causing a predetermined output unit to output output information related to the collection of the voice in a mode corresponding to the acquired context information.

In addition, according to the present disclosure, there is provided an information processing method, including, by a computer system: transmitting context information in a period related to collection of a voice acquired by a predetermined acquiring unit to an external device; and presenting output information related to the collection of the voice transmitted from the external device in a mode corresponding to the context information.

In addition, according to the present disclosure, there is provided an information processing device, including: an acquiring unit configured to acquire a detection result of a voice included in a collected sound; and a control unit configured to cause a predetermined output unit to notify of notification information on a basis of the detection result of the voice at least before information based on a result of a voice recognition process for the voice is presented.

In addition, according to the present disclosure, there is provided an information processing device, including: a transmitting unit configured to transmit a collection result of a sound by a predetermined sound collection unit to an external device; and an output unit configured to notify of notification information on a basis of control corresponding to a detection result of a voice included in the sound at least before information based on a result of a voice recognition process for the voice included in the sound transmitted from the external device is presented.

In addition, according to the present disclosure, there is provided an information processing method, including, by a computer system: acquiring a detection result of a voice included in a collected sound; and causing a predetermined output unit to notify of notification information on a basis of the detection result of the voice at least before information based on a result of a voice recognition process for the voice is presented.

In addition, according to the present disclosure, there is provided an information processing method, including, by a computer system: transmitting a collection result of a sound by a predetermined sound collection unit to an external device; and notifying of notification information on a basis of a detection result of a voice included in the sound at least before information based on a result of a voice recognition process for the voice transmitted from the external device is presented.

Advantageous Effects of Invention

According to the present disclosure described above, an information processing device and an information processing method that can further improve the operability of user interfaces that use a voice as an input are provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is an explanatory diagram for describing an overview of an information processing system according to Modified example 1-2.

FIG. 8 is an explanatory diagram for describing an example of the UI provided by the information processing system according to the embodiment.

FIG. 17 is an explanatory diagram for describing an example of a UI provided by an information processing system according to Modified example 3-2.

FIG. 18 is an explanatory diagram for describing another example of a UI provided by an information processing system according to Modified example 3-2.

FIG. 19 is a function block diagram illustrating an example of a hardware configuration of an information processing device included in the information processing system according to an embodiment of the present disclosure.

MODE(S) FOR CARRYING OUT THE INVENTION

Figure 1:
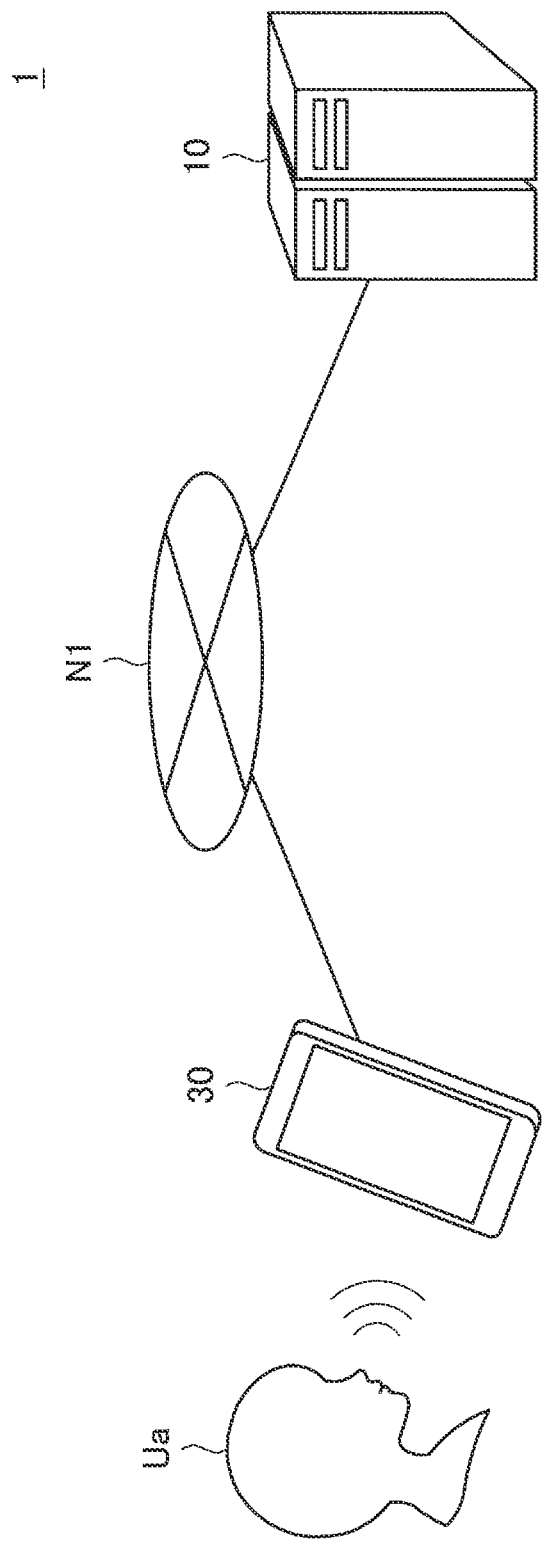
FIG. 1 is an explanatory diagram for describing an example of a schematic system configuration of an information processing system according to an embodiment of the present disclosure.

Hereinafter, (a) preferred embodiment (s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, the description will proceed in the following order.
1. Configuration
1.1. System configuration
1.2. Functional configuration
2. First embodiment
2.1. Overview
2.2. Process
2.3. Modified examples
2.3.1. Modified Example 1-1: example of control according to context information
2.3.2. Modified Example 1-2: example of information presentation mode according to context information
2.3.3. Modified Example 1-3: other application examples
2.4. Evaluation
3. Second embodiment
3.1. Overview
3.2. Basic principle
3.3. Process
3.4. Modified examples
3.4.1. Modified Example 2-1: example of display control
3.4.2. Modified Example 2-2: example of control in case of recognizing English voice
3.4.3. Modified Example 2-3: other control examples
3.5. Evaluation
4. Third embodiment
4.1. Overview
4.2. Process
4.3. Modified example
4.3.1. Modified Example 3-1: example of notification information
4.3.2. Modified Example 3-2: presentation example of voice recognition state
4.4. Evaluation
5. Hardware configuration
6. Application example
7. Conclusion 1. Configuration 1.1. System Configuration First, a schematic configuration of an information processing system according to an embodiment of the present disclosure will be described with reference to FIG. 1. FIG. 1 is an explanatory diagram for describing an example of a schematic system configuration of an information processing system according to the present embodiment.

The information processing system according to the present embodiment includes an information processing device 10 and an input/output device 30 as illustrated in FIG. 1. The information processing device 10 and the input/output device 30 are configured to be capable of transmitting and receiving information to and from each other via a so-called network N1. Note that a type of the network N1 is not particularly limited. As a specific example, the network N1 may be configured as a so-called wireless network such as a network based on the Wi-Fi (registered trademark) standard. In addition, as another example, the network N1 may be configured as the Internet, a dedicated line, a local area network (LAN), a wide area network (WAN), or the like. In addition, the network N1 may include a plurality of networks and a part thereof may be configured as a wired network.

The input/output device 30 has a configuration for acquiring various types of input information and presenting various types of output information with respect to a user Ua holding the input/output device 30. In particular, the input/output device 30 according to the present embodiment is configured to have a sound collection unit, for example, a so-called microphone and to be capable of collecting a voice of the user Ua. The input/output device 30 may transmit, for example, a voice (sound) collected by the sound collection unit to the information processing device 10 via the network N1. In addition, the input/output device 30 may have a display unit such as a so-called liquid crystal display or an organic EL display and various output units such as a sound output unit like a so-called utterer, and may be configured to be capable of outputting information via the output units.

The input/output device 30 may acquire output information indicating results of a process using a voice transmitted to the information processing device 10 as an input from the information processing device 10 via the network N1 and present the output information acquired via the output units to the user Ua on the basis of the above-described configuration. As a more specific example, the input/output device 30 may acquire character information obtained by converting the voice from the information processing device 10 and present the character information to the user Ua by causing the display unit to display the acquired character information. In addition, as another example, the input/output device 30 may convert the character information acquired from the information processing device 10 into a voice on the basis of a text-to-speech (TTS) technology or the like, causing the sound output unit to output the converted voice, and thereby present the voice (i.e., a voice obtained by converting the character information) to the user Ua audibly In addition, the input/output device 30 may be configured to be capable of acquiring context information indicating various states or situations directly or indirectly. In this case, the input/output device 30 may transmit the acquired context information to the information processing device 10. Accordingly, the information processing device 10 can recognize the states or situations on the basis of the context information acquired from the input/output device 30.

Note that, as context information, for example, information indicating a state of an external environment of the input/output device 30 (further, an external environment of the user Ua) may be exemplified. As a specific example, the input/output device 30 may acquire information indicating an influence of noise (e.g., a volume of noise, a signal-to-noise ratio (SNR), etc. as context information by acquiring sound collection results of ambient noise from the sound collection unit that collects sound from the external environment.

In addition, as context information, a state of a user (utterer) at the time of utterance, or information regarding a situation where the user is located may be exemplified. In a situation in which the user communicates with another user via the input/output device 30, for example, information regarding the partner of the communication (e.g., information indicating a relationship with the utterer, etc.) may be acquired as context information. In this case, for example, the input/output device 30 may specify the information regarding the partner of the communication on the basis of information of an external device with which communication has been established.

In addition, information regarding a situation in which information is input to various input devices may be acquired as context information. For example, a frequency of operations of the input device also helps a state of the user operating an input device such as a keyboard or a controller and a situation in which the user is located to be inferred.

In addition, as context information, information indicating a state of the input/output device 30 may be acquired. As a specific example, information regarding an application being executed by the input/output device 30 may be exemplified. Such context information also helps, for example, a state of the user operating the input/output device 30 and a situation where the user is located to be inferred.

In addition, the input/output device 30 may acquire a detection result of biological information such as a temperature, respiration, a heartbeat, and an amount of perspiration of the user from detection units such as various sensors as context information indicating states of the users.

In addition, information regarding a mode of speech such as a speed of speech or a volume of a voice may be acquired as context information. For example, the input/output device 30 may recognize a speed, a volume, or the like of speech on the basis of a voice collection result. In addition, on the basis of a quality of the collected voice, information indicating an attribute (e.g., sex or age) of the user uttering the voice (i.e., information indicating who is uttering) can also be acquired as context information. In addition, on the basis of the voice collection result, information regarding a state of input information (i.e., situation in which information is input) such as information regarding a length of the uttered voice or information regarding a length of character information obtained by converting the voice (i.e., a length of a character string uttered by the user) can also be acquired as context information. Of course, information to be input is not limited to a voice, and information indicating various states or situations of other types of input information may be acquired. As a specific example, information indicating an input speed of information with respect to an input device such as a keyboard or a controller, information indicating strength of input (e.g., pressure), and the like may be acquired as context information. In addition, the input/output device 30 may acquire a voice collection result as context information for indirectly acquiring information indicating the above-described various states or situations.

Note that a timing at which the input/output device 30 acquires the above-described context information is not particularly limited. For example, the input/output device 30 may acquire context information in a case in which the user utters (i.e., a case in which a voice is collected). As a more specific example, in a case in which a voice uttered by the user starts to be collected on the basis of a predetermined operation, as in so-called push-to-talk (PTT), the input/output device 30 may acquire context information on the basis of the detection of the operation. With this configuration, the input/output device 30 can acquire context information regarding various states or situations at a timing at which the user starts uttering (i.e., a timing at which collection of a voice is started). In addition, the input/output device 30 may successively acquire context information during a period in which speech of the user is being detected (i.e., during a period in which collection of a voice continues).

In addition, the input/output device 30 may acquire context information regarding the state or situation immediately before the start of utterance in a case in which the user has started uttering (i.e., in a case in which collection of a voice has been started). As a specific example, a state of the user or a situation in which the user is located at the time of utterance can also be inferred from context information indicating an operation situation with respect to another input device of the user in the period immediately before the user starts uttering. In such a case, for example, the input/output device 30 may successively monitor a predetermined state or situation and acquire context information for the period on the basis of monitoring results before and after a detection timing of a predetermined event (e.g., a start of utterance by the user) using detection of the event as a trigger. With this configuration, in a case in which the start of utterance by the user is detected, for example, the input/output device 30 can acquire information regarding various states or situations in a period of several seconds (e.g., about 10 seconds) before and after the start of the utterance as context information regarding the period of the utterance.

Note that, in a case in which a "period for collection of a voice" is used in the present disclosure, the period is assumed to include the period immediately before collection of the voice is started, without limitation to only the period in which the voice is collected. Likewise, in a case in which a "period for utterance" is used, the period is assumed to include the period immediately before a voice is uttered, without limitation to only a voice uttered period. Note that, in general, if context information for the period of about 10 seconds before and after the start of collection of a voice can be acquired, a state of the user who uttered the voice or a situation in which the user is located can be inferred. Of course, it is needless to say that a period for which context information is acquired may be changed in accordance with a use case.

Next, the information processing device 10 will be described. The information processing device 10 acquires collection results of a voice (sound) from the input/output device 30 and executes various processes using the acquired voice as input information. Specifically, in a case in which a collection result of sound is acquired from the input/output device 30, the information processing device 10 may detect a voice included in the sound or extract a voice from the sound on the basis of the detection result. In addition, the information processing device 10 may convert an acquired voice into character information by performing a voice recognition process (so-called sound analysis) on the voice. In addition, at this time, the information processing device 10 may convert the character information obtained by converting the voice into character information of which the semantic content is taken into account (e.g., a sentence of a combination of Chinese characters and Japanese characters, etc.) on the basis of natural language processing (so-called language analysis) such as morphemic analysis, syntactic analysis, and semantic analysis. In addition, the information processing device 10 may execute a function instructed through the voice by recognizing the semantic content of the character information obtained by converting the voice.

In addition, the information processing device 10 may transmit execution results of various processes using voice collection results as input information to the input/output device 30 via the network N1. As a specific example, in a case in which a voice is detected in a voice collection result, the information processing device 10 may report the detection result to the input/output device 30. In addition, the information processing device 10 may transmit character information obtained by converting the voice to the input/output device 30 on the basis of a result of the voice recognition process or natural language processing on the voice collection result. In addition, at this time, the information processing device 10 may cause the input/output device 30 to output the character information obtained by converting the voice via a predetermined output unit by controlling an operation of the input/output device 30.

In addition, the information processing device 10 may acquire the above-described context information from the input/output device 30. Accordingly, the information processing device 10 can recognize various states or situations such as a state of a surrounding environment of the input/output device 30, a state of the user holding the input/output device 30, or the like. In addition, in this case, the information processing device 10 may control various processes in accordance with recognition results of the various states or situations. As a specific example, the information processing device 10 may control a presentation mode of character information obtained by converting a voice in accordance with acquired context information (i.e., in accordance with a state or a situation indicated by the context information).

Note that the above-described system configuration is merely an example, and the embodiment is not necessarily limited only to the example illustrated in FIG. 1. As a specific example, the information processing device 10 may include a plurality of devices (e.g., servers, etc. cooperating with each other. In addition, as another example, the information processing device 10 and the input/output device 30 may be configured in an integrated manner.

The schematic configuration of the information processing system according to the embodiment of the present disclosure has been described above with reference to FIG. 1. Note that each of various embodiments of the information processing system according to the present disclosure will be described below

1.2. Functional Configuration

Figure 2:
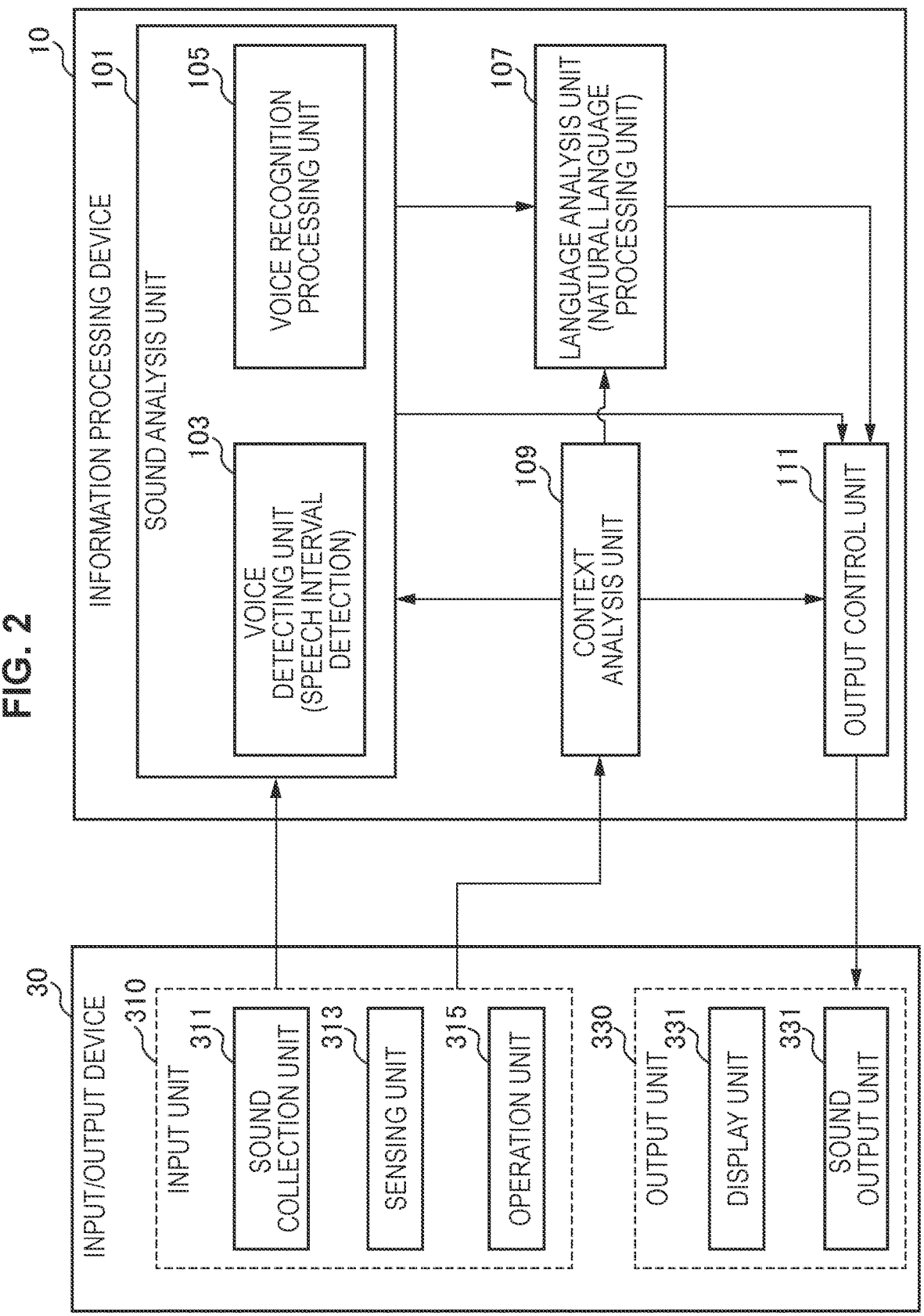
FIG. 2 is a block diagram illustrating an example of a functional configuration of the information processing system according to an embodiment of the present disclosure.

Next, with reference to FIG. 2, an example of a functional configuration of the information processing system according to one embodiment of the present disclosure will be described focusing on configurations of the information processing device 10 and the input/output device 30 illustrated in FIG. 1. FIG. 2 is a block diagram illustrating an example of a functional configuration of an information processing system according to one embodiment of the present disclosure. Further, in the present description, functional configurations of the information processing device 10 and the input/output device 30 will be described focusing on common parts in information processing systems according to respective embodiments to be described below and a configuration or an operation specific to each embodiment will be described later.

In addition, for the sake of easier understanding of the configurations of the information processing device 10 and the input/output device 30, a communication unit of the information processing device 10 and the input/output device 30 for transmitting and receiving information via a network is not illustrated in the example illustrated in FIG. 2. Note that a configuration of the communication unit may be appropriately changed in accordance with the type of network. In a case in which the network is a wireless network, for example, the communication unit may include a baseband (BB) processor, an RF circuit, and the like. Note that, in the following description, in a case in which each internal configuration of the information processing device 10 and the input/output device 30 performs transmission and reception of information with an external device via the network, the transmission and reception of information are assumed to be performed via the communication unit even in a case in which there is no particular description thereof.

First, the configuration of the input/output device 30 will be described. As illustrated in FIG. 2, the input/output device 30 includes an input unit 310 and an output unit 330. The input unit 310 includes, for example, a sound collection unit 311 and a sensing unit 313. Further, the input unit 310 may include an operation unit 315. Further, the output unit 330 includes, for example, a display unit 331. Further, the output unit 330 may include a sound output unit 333.

The sound collection unit 311 includes a sound collection device such as a so-called microphone, and collects sound such as a voice of a user. A sound signal based on a sound collection result from the sound collection unit 311 is, for example, transmitted to the information processing device 10 via the network.

The sensing unit 313 has a configuration for acquiring context information indicating various states or situations. For example, the sensing unit 313 may include various sensors and acquire information indicating states of a surrounding environment from the sensors as context information. In addition, the sensing unit 313 may include a sound collection unit that collects sound of an external environment and acquire the sound collection result from the sound collection unit as context information indicating an influence of noise. In addition, the sensing unit 313 may also acquire context information from various devices provided outside the input/output device 30. As a specific example, the sensing unit 313 may acquire context information indicating biological information of a user from various sensors installed on the body of the user. Note that context information acquired by the sensing unit 313 is, for example, transmitted to the information processing device 10 via the network.

The operation unit 315 has a configuration for receiving input operations from a user and includes input devices, for example, buttons, a touch panel, a so-called pointing device, or the like. For example, selection of some display information among display information presented through the display unit 331 to be described later may be performed on the basis of an operation performed through the operation unit 315. That is, the input/output device 30 may recognize an operation target (i.e., a selection target) on the basis of the content of an operation input by the user with respect to the operation unit 315. In addition, an operation for starting voice collection such as so-called PTT may be performed via the operation unit 315.

The display unit 331 includes a display device such as a so-called liquid crystal display or organic EL display, and presents information to a user by displaying various kinds of display information. The display unit 331 presents output information transmitted from the information processing device 10 to a user by, for example, displaying the output information as display information. In addition, at this time, the display unit 331 may display output information transmitted from the information processing device 10 as display information in a mode designated by the information processing device 10.

The sound output unit 333 is configured with an audio device such as a so-called speaker, and outputs a sound such as a voice to present information to the user. For example, the display unit 331 outputs output information configured as a voice or a sound transmitted from the information processing device 10, and presents the output information to the user. Further, the sound output unit 333 may output a voice obtained by converting output information configured as character information transmitted from the information processing device 10 on the basis of a technique such as text to speech (TTS) conversion and present the output information to the user as a voice.

Note that the above-described configurations included in the input unit 310 and the output unit 330 are merely examples, and a configuration other than the above-described configurations may be included in accordance with a use application of the input/output device 30.

Next, a configuration of the information processing device 10 will be described. As illustrated in FIG. 2, the information processing device 10 includes a sound analysis unit 101, a language analysis unit 107, a context analysis unit 109, and an output control unit 111.

The context analysis unit 109 acquires context information from the input/output device 30 and recognizes various states or situations by analyzing the acquired context information. As a specific example, the context analysis unit 109 may acquire a sound collection result of a surrounding environment of the input/output device 30 as context information. In this case, for example, the context analysis unit 109 may recognize the magnitude of an influence of noise (e.g., the volume of noise, etc.) in the sound collection environment on the basis of the sound collection result.

When the noise level is 60 dB or higher, this tends to be perceived as noisy in general. Note that the volume of a "normal conversation," a "chime," and an "inside of a car running at 40 kilometers per hour" corresponds to about 60 dB. In addition, when the noise level is 80 dB or higher, this tends to be perceived as very noisy. Note that the volume of an "inside of a subway (with doors open)," and "sound of a piano" corresponds to about 80 dB. Thus, when the volume of noise is 60 dB or higher, for example, the context analysis unit 109 may recognize an environment with a considerable influence of noise (i.e., a noisy environment).

Further, as another example, the context analysis unit 109 may acquire a sound signal based on a collection result of a voice spoken by the user as context information. In this case, for example, the context analysis unit 109 may recognize a speed of speech, a volume of voice, a quality of voice, or the like on the basis of a result of sound analysis (for example, a voice recognition process) for a sound signal. Further, the context analysis unit 109 may estimate other states or situations on the basis of a recognition result such as a speed of speech, a volume of voice, a quality of voice, and the like. As a specific example, it is also possible to estimate an age, a sex, or the like of the user who speaks from a quality of voice or the like. Further, the context analysis unit 109 may acquire a result of sound analysis on the sound signal from the sound analysis unit 101.

In addition, as another example, the context analysis unit 109 may acquire the results of the sound analysis and language analysis with respect to the sound signal based on the collection result of the voice uttered by the user as context information. In this case, for example, the context analysis unit 109 may recognize the length of the voice uttered by the user, the length of the character string uttered by the user (i.e., the length of the character information obtained by converting the voice), or the like on the basis of the results of the sound analysis and language analysis with respect to the sound signal.

Of course, it will be appreciated that the example described above is only an example. As described above, the context analysis unit 109 can recognize or estimate other states or situations in accordance with the acquired context information in addition to the example described above.

As described above, the context analysis unit 109 recognizes various kinds of states or situations on the basis of the acquired context information, and outputs information indicating a recognition result to the output control unit 111. Further, the context analysis unit 109 may output information indicating recognition results of various kinds of states or situations to the sound analysis unit 101 and the language analysis unit 107.

The sound analysis unit 101 acquires a sound signal based on a sound collection result by the input unit 310 (the sound collection unit 311) of the input/output device 30, performs a sound analysis process on the acquired sound signal, and executes a process related to extraction of a voice included in the sound signal or recognition of the voice. As illustrated in FIG. 2, the sound analysis unit 101 includes, for example, a voice detecting unit 103 and a voice recognition processing unit 105.

The voice detecting unit 103 is a component for extracting a voice from the acquired sound signal. The voice detecting unit 103 extracts a voice signal included in the sound signal on the basis of a technique such as voice activity detection (VAD). Then, the voice detecting unit 103 outputs the voice signal extracted from the sound signal to the voice recognition processing unit 105. Further, in a case in which the voice signal included in the sound signal is detected, the voice detecting unit 103 may notify the output control unit 111 of information indicating the detection result.

The voice recognition processing unit 105 executes a so-called voice recognition process on the voice signal extracted from the sound signal by the voice detecting unit 103, and converts the voice signal into character information indicating a pronunciation of a voice. As a specific example, the voice recognition processing unit 105 converts the voice signal based on a collection result of Japanese voice into character information of hiragana or katakana indicating speech content. Then, the voice recognition processing unit 105 outputs information indicating the result of the voice recognition process (for example, the character information indicating the pronunciation of the voice) to the language analysis unit 107. Further, the voice recognition processing unit 105 may output the information indicating the result of the voice recognition process to the output control unit 111.

The voice recognition processing unit 105 may acquire the information indicating the recognition results of various kinds of states or situations from the context analysis unit 109 and control the voice recognition process in accordance with the state or situation indicated by the acquired information. As a specific example, the voice recognition processing unit 105 may control a range of the voice signal which is a target of the voice recognition process in accordance with a state or a situation indicated by the acquired information. Further, the voice recognition processing unit 105 may control a search range (for example, a pattern to be referred to, a condition to be applied, or the like) when the voice recognition process is performed on the voice on the basis of an acoustic feature of the voice (hereinafter also referred to as a "sound model") in accordance with the state or the situation indicated by the acquired information. Further, this control will be described later in detail.

The language analysis unit 107 acquires the result of the voice recognition process from the voice recognition processing unit 105, executes a so-called language analysis process (a natural language process) on the character information obtained as the result of the voice recognition process, and converts the character information into character information in which semantic content is considered.

As a specific example, the language analysis unit 107 classifies the character information into morphemes by performing morphological analysis or syntax analysis on the acquired character information, and recognizes relevance between the classified morphemes (for example, a modification relation or the like). Further, the language analysis unit 107 executes, for example, semantic analysis based on dictionary data or the like on the result of the morpheme analysis or the syntax analysis, recognizes semantic content indicated by the acquired character information (for example, a sentence), and converts the character information into character information in which the semantic content is considered (for example, a sentence including kanji or the like).

Further, the language analysis unit 107 may acquire the information indicating the recognition results of various kinds of states or situations from the context analysis unit 109 and control the language analysis process described above in accordance with the state or the situation indicated by the acquired state information. As a specific example, the language analysis unit 107 may control the search range of the character information serving as a processing target in the language analysis process in accordance with the state or the situation indicated by the acquired information. Further, the language analysis unit 107 may control the search range (for example, a pattern to be referred to, a condition to be applied, or the like) when the language analysis process is executed on the result of the voice recognition process for the voice on the basis of a linguistic feature of voice (hereinafter also referred to as a "language model") in accordance with the state or the situation indicated by the acquired information. Further, this control will be described later in detail.

Then, the language analysis unit 107 outputs the information indicating the result of the language analysis process (for example, information indicating a conversion result from the character information indicating the pronunciation of the voice to the character information in which the semantic content is considered) to the output control unit 111.

The output control unit 111 acquires, for example, the character information into which the voice is converted in consideration of the semantic content as the information indicating the result of the language analysis process. At this time, the output control unit 111 may present the acquired character information to the input/output device 30. Accordingly, the user holding the input/output device 30 can check the recognition result of the voice uttered by himself or herself via the output unit 330 (e.g., the display unit 331) of the input/output device 30.

Further, the output control unit 111 may acquire the information indicating the recognition results of various kinds of states or situations based on the acquired context information from the context analysis unit 109 and control a mode of the character information into which the voice serving as a presentation target is converted in accordance with the recognition result. As a specific example, the output control unit 111 may perform control such that at least some phrases of the character information serving as the presentation target are presented as the character information indicating the pronunciation of the phrase in accordance with the state or the situation indicated by the acquired information. Further, this control will be described later in detail.

Further, when the input/output device 30 is caused to display the character information into which the voice is converted, the output control unit 111 may cause the input/output device 30 to present various kinds of information step by step in accordance with a state of the sound analysis or the language analysis until the collected voice is converted into the character information. As a specific example, the output control unit 111 may receive a notification indicating the detection result of the voice included in the sound signal from the sound analysis unit 101 and cause the input/output device 30 to present notification information in accordance with a timing at which the notification is received. Then, the output control unit 111 may acquire the information indicating the result of the voice recognition process for the voice signal extracted from the sound signal from the sound analysis unit 101 and cause the input/output device 30 to present output information based on the result of the voice recognition process in accordance with a timing at which the information is acquired. Then, the output control unit 111 may acquire the information indicating the result of the language analysis process for the result of the voice recognition process from the language analysis unit 107 and cause the input/output device 30 to present output information based on the result of the language analysis process in accordance with a timing at which the information is acquired. Further, this control will be described later in detail.

Note that the functional configuration of the information processing system illustrated in FIG. 2 is merely an example, and a functional configuration of the information processing system is not necessarily limited only to the example illustrated in FIG. 2 as long as the functions of each of the above-described configurations can be realized. For example, part of the configurations of the information processing device 10 may be provided outside the information processing device 10. As a specific example, a configuration corresponding to the output control unit 111 may be provided on the input/output device 30 side. In this case, the input/output device 30 may acquire, for example, the information indicating the detection result of the voice included in the sound signal, the result of the voice recognition process for the voice, the result of the language analysis process for the result of the voice recognition process, and the recognition result of various kinds of states or situations based on the context information, from the information processing device 10. In addition, at least part of the configurations included in the input unit 310 and the output unit 330 may be provided outside the input/output device 30. In addition, the input/output device 30 and the information processing device 10 may be configured in an integrated manner as described above.

The example of the functional configuration of the information processing system according to one embodiment of the present disclosure has been described with reference to FIG. 2 focusing on the configurations of the information processing device 10 and the input/output device 30 illustrated in FIG. 1. Further, in the following description, various kinds of embodiments of the information processing system according to the present disclosure will be described.

2. First Embodiment

2.1. Overview

First, an information processing system according to a first embodiment of the present disclosure will be described.

As described above, users can input character information through a voice without using an input device such as a keyboard by applying, for example, a voice recognition technology or a natural language processing technology.

On the other hand, the accuracy of the voice recognition process or the natural language process is not necessarily high, and the voice may be assumed to be erroneously recognized. For example, there are cases in which a system that recognizes the voice spoken by the user (hereinafter also referred to as a "voice recognition system") controls the search range of the voice recognition process or the natural language process in order to improve a response speed (for example, a processing speed) for spoken voice. However, if the search range of the voice recognition process or the natural language process is restricted, the accuracy of the voice recognition process or the natural language process (that is, the accuracy of the process related to recognition of the voice) may decrease, and eventually, the voice recognition may fail.

On the other hand, there are cases in which the accuracy of recognition can be improved by a way of speech such as "speaking clearly," "speaking at a high volume," or "not saying unnecessary words." However, it is often difficult for the user to recognize a speech method (that is, a way to speak) suitable for each voice recognition system. Therefore, in the recognition of the voice on the basis of the voice recognition process or the natural language process, it tends to be difficult for the recognition accuracy to increase.

Further, as another method, it is also possible to improve the accuracy of the process related to the voice recognition by not restricting the search range of the voice recognition process or the natural language process. However, in this case, since the throughput of the voice recognition process or the natural language process increases, the processing speed decreases, and eventually, the response speed to the voice speech decreases. In other words, there is a high tendency that the improvement of the response speed and the improvement of the recognition accuracy are in an antinomic relation.

By the way, a characteristic required for the system may be different depending on a situation or a use case in which the voice recognition system is used. For example, in a certain situation, a faster response (for example, a faster response speed) may be required with respect to a speech. Further, in other scenes, the higher recognition accuracy may be required than the response speed in another situation.

In view of this situation, the information processing system according to the present embodiment controls a presentation mode of the character information into which the voice is converted in accordance with various kinds of states or situations (that is, the context information) in a period related to the voice collection. As a specific example, the information processing system according to the present embodiment determines which of the response speed and the recognition accuracy is emphasized in accordance with the context information acquired in the period related to the voice collection, and performs the conversion of the collected voice into the character information or the presentation of the character information in the mode corresponding to the determination result.

Figure 3:
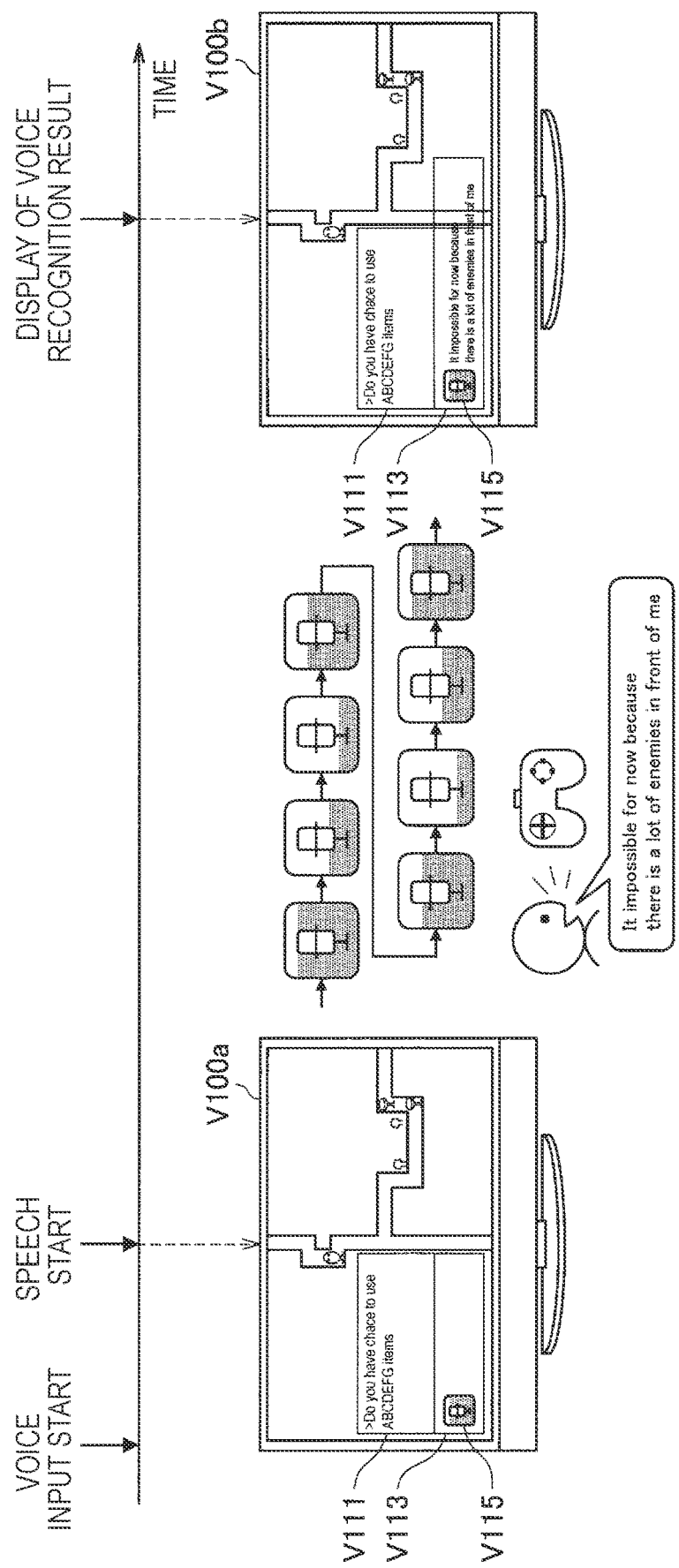
FIG. 3 is an explanatory diagram for describing an overview of an information processing system according to a first embodiment of the present disclosure.
Figure 4:
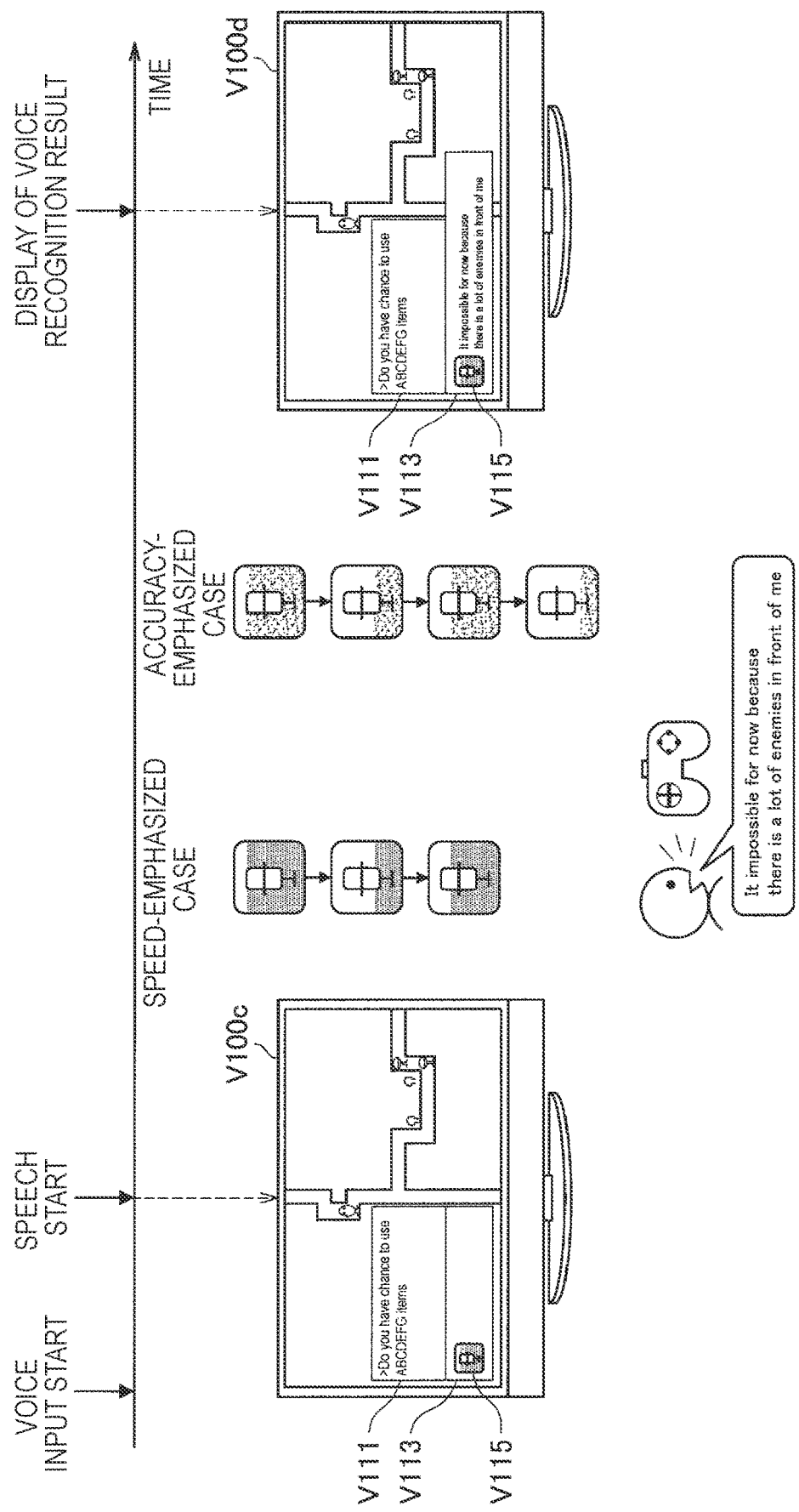
FIG. 4 is an explanatory diagram for describing an overview of an information processing system according to the embodiment.

Here, an overview of the information processing system according to the present embodiment will be described with reference to FIGS. 3 and 4 using a specific example. FIGS. 3 and 4 are explanatory diagrams for describing an overview of the information processing system according to the present embodiment and illustrate an example of feedback of the recognition result of the voice from the system in a case in which the user inputs information by voice while playing a game.

For example, FIG. 3 illustrates an example of feedback of a voice recognition result by a general voice recognition system. Further, hereinafter, the example illustrated in FIG. 3 is also referred to as a "comparative example." In FIG. 3, reference numeral V100a schematically indicates a state of a game screen at a timing at which the user starts a speech. Further, reference numeral V100b schematically indicates a state of a game screen at a timing at which a recognition result of a voice spoken by the user is presented. Further, in a case in which the game screens V100a and V100b are not particularly distinguished, they are also referred to simply as a "game screen V100." Further, reference numerals V111, V113, and V115 indicate examples of display information displayed on the game screen V100. For example, reference numeral V111 indicates an output field in which the system notifies the user of a situation in the game. Further, reference numeral V113 indicates an output field in which the recognition result of the voice spoken by user is presented. Further, reference numeral V115 indicates display information (for example, an icon or the like) for notifying the user of a voice (sound) collection situation.

For example, it is assumed that the user confirms information presented in the output field V111 while playing the game and inputs information by speaking a voice to the system via a sound collection unit installed in a controller. In this case, for example, the system presents a collection situation of the voice spoken by the user in real time while changing the display mode of the display information V115 as illustrated in a middle diagram of FIG. 3, and if the process related to the voice recognition is completed, the system presents information indicating the recognition result to the output field V115. For example, in the example illustrated in FIG. 3, the system converts the voice spoken by the user into the character information, and presents the character information to the output field V113 as the voice recognition result.

On the other hand, for example, wider a situation in which the user concentrates on playing the game, the user tends to have lower attention to information other than the game play screen. Therefore, for example, in a situation in which it is difficult to confirm the recognition result of the voice presented to the output field V113 since a change in the display information V115 (that is, the voice recognition situation) can be confirmed from a peripheral visual field. On the other hand, under a situation in which the user does not concentrate on playing the game play too much, the user's attention to information other than the game play screen tends to be higher than in a situation in which the user concentrates on playing the game. For this reason, under such a situation, the user can often confirm the recognition result of the voice presented to the output field V113 comfortably. The information processing system according to the present embodiment recognizes such a state or situation changes, and dynamically switches, for example, between a process in which the response speed is emphasized and a process in which the recognition accuracy is emphasized as the process related to the voice recognition or the process related to the presentation of the recognition result in accordance with the recognition result of the state or the situation.

For example, FIG. 4 illustrates an example of the feedback of the voice recognition result by the information processing system according to the present embodiment. In FIG. 4, reference numeral V100c schematically indicates a state of the game screen at a timing at which the user starts a speech. Further, reference numeral V100d schematically indicates a state of the game screen at a timing at which the recognition result of the voice spoken by the user is presented. Further, in FIG. 4, targets having reference numerals similar to those in FIG. 3 indicate targets similar to those in the example illustrated in FIG. 3.

As a more specific example, the information processing system according to the present embodiment may dynamically switch the process related to the voice recognition or the process related to the presentation of the recognition result in accordance with the speed of speech of the user. For example, humans tend to be slow in the speed of speech in a situation in which they more concentrate on a certain task. On the other hand, humans tend not to be slow in the speed of speech in a situation in which they can speak with concentration. Using such characteristics, the information processing system recognizes that the user is concentrating on a certain task in a case in which it is recognized the speed of speech of the user is slower than a usual speed of speech on the basis of, for example, the context information indicating the speed of speech of the user. In this case, the information processing system improves the voice recognition accuracy by, for example, performing control such that the search range of the voice recognition process or the natural language process for the spoken voice becomes wider. Further, at this time, as illustrated in FIG. 4, the information processing system may present information indicating that the search range of the voice recognition process or the natural language process is controlled such that the voice recognition accuracy is improved to the user by changing the display mode of the display information V115. Further, information for notifying of the voice collection situation, control content of the voice recognition process or the natural language process (for example, the control situation of the search range), or the like such as the display information V115 corresponds to "output information related to voice collection."

As described above, the information processing system according to the present embodiment dynamically controls the presentation mode of the voice recognition result (for example, the character information into which the voice is converted) in accordance with various kinds of states or situations (for example, the speech mode) in the period related to the voice collection. With such a configuration, for example, in a situation in which it is difficult for the user to confirm the recognition result of the spoken voice since the user concentrates on a certain task, it is possible to switch to the control in which the voice recognition accuracy is more emphasized. Therefore, the user can concentrate on the task without being conscious of the confirming of the recognition result. Further, as another example, in a situation in which the user need not pay attention to a specific task and can check the voice recognition result comfortably, it is possible to switch to the control in which the response speed is more emphasized. Therefore, the user can promptly confirm the recognition result of the voice spoken by the user.

The overview of the information processing system according to the first embodiment of the present disclosure has been described above with reference to FIGS. 3 and 4. Further, the information processing system according to the present embodiment will be described below in further detail.

2.2. Process

Figure 5:
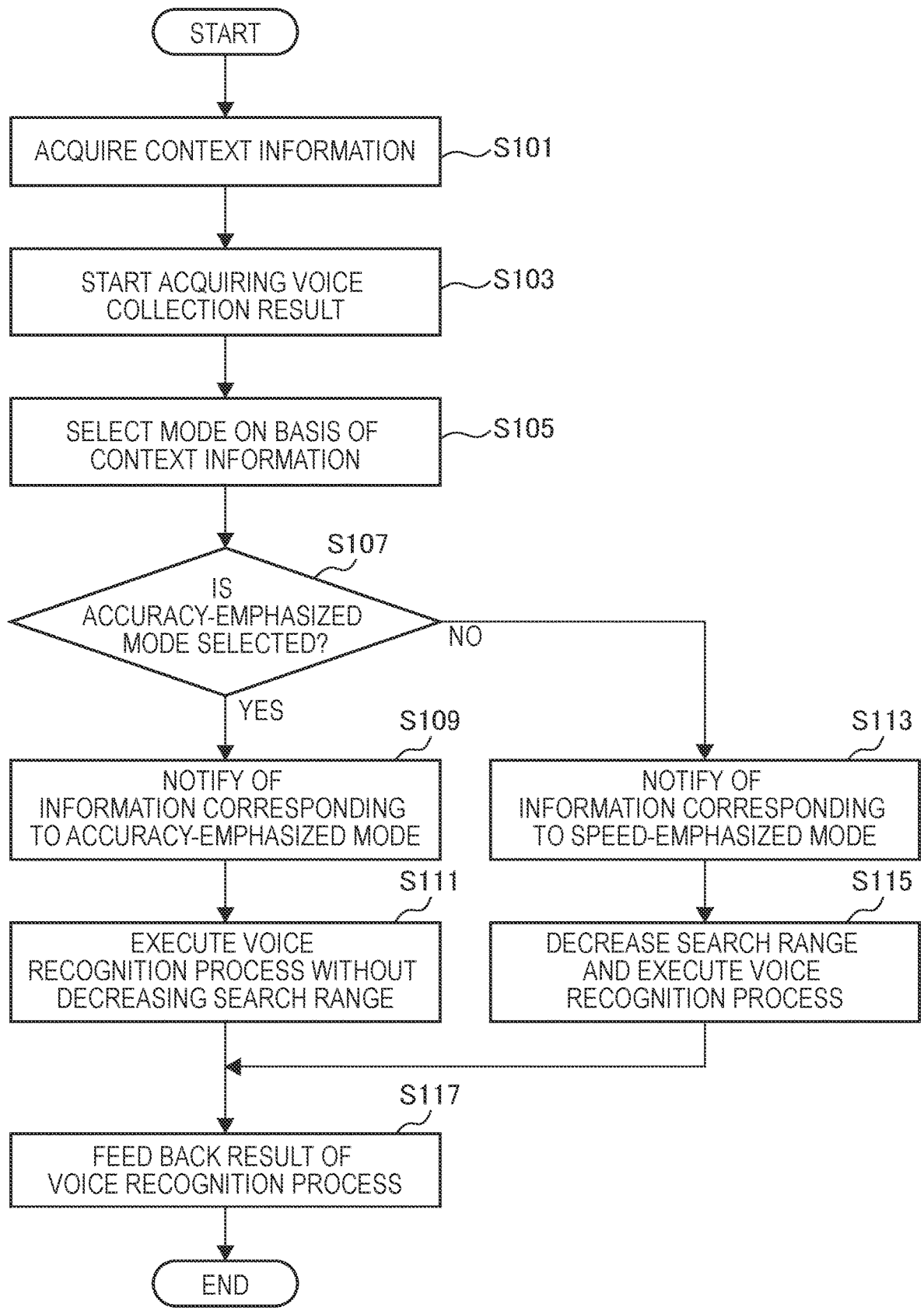
FIG. 5 is a flowchart illustrating an example of a flow of a series of processes of the information processing system according to the embodiment.

First, an example of a flow of a series of processes of the information processing system according to the present embodiment will be described with reference to FIG. 5. FIG. 5 is a flowchart illustrating an example of a flow of a series of processes of the information processing system according to the present embodiment.

The input/output device 30 (for example, the sensing unit 313) acquires the context information indicating a predetermined state or situation (for example, the seethe mode), and transmits the acquired context information to the information processing device 10 (S101). Further, if a predetermined event (for example, an operation for speech in PTT) is detected, the input/output device 30 (the sound collection unit 311) collects the voice spoken by the user and transmits the sound signal based on the voice collection result to the information processing device 10 (S103).

The information processing device 10 (context analysis unit 109) acquires the context information from the input/output device 30, analyzes the acquired context information, and recognizes a predetermined state or situation in the period related to the voice collection. Then, the information processing device 10 selects an operation mode for executing the process related to the voice recognition or the process related to the presentation of the voice recognition result in accordance with the recognized state or situation (S105). Further, in the present description, the information processing device 10 switches between a mode in which the voice recognition accuracy is emphasized (an accuracy-emphasized mode) and a mode in which the response speed of the voice recognition result is emphasized (a speed-emphasized mode).

For example, in a case in which the accuracy-emphasized mode is selected (YES in S107), the information processing device 10 (the output control unit 111) causes the input/output device 30 to present the information indicating that the accuracy-emphasized mode is selected. As a specific example, the information processing device 10 performs control so that a presentation mode of predetermined output information to be presented by the input/output device 30 becomes a mode corresponding to the selected accuracy-emphasized mode (S109). Further, in this case, the information processing device 10 (for example, the sound analysis unit 101 and the language analysis unit 107) executes each process without decreasing the search range when the voice recognition process is executed for the voice or the search range when the language analysis process is executed on the result of the voice recognition process for the voice (S111).

Further, in a case in which the speed-emphasized mode is selected (NO in S107), the information processing device 10 (the output control unit 111) causes the input/output device 30 to present the information indicating that the speed-emphasized mode is selected. As a specific example, the information processing device 10 performs control such that a presentation mode of predetermined output information to be presented by the input/output device 30 becomes a mode corresponding to the selected speed-emphasized mode (S113). Further, in this case, the information processing device 10 (for example, the sound analysis unit 101 and the language analysis unit 107) decreases the search range when the voice recognition process is executed for the voice or the search range when the language analysis process is executed on the result of the voice recognition process for the voice, and executes each process (S115).

Then, the information processing device 10 (the output control unit 111) causes the input/output device 30 to present the result of the voice recognition process on the basis of the result of the voice recognition process (sound analysis) or the natural language process (language analysis) for the sound signal based on the voice collection result. As a specific example, the information processing device 10 may cause the input/output device 30 to present the character information into which the voice is converted on the basis of the voice recognition process or a pre-language process (S117).

The example of the flow of a series of processes of the information processing system according to the present embodiment has been described above with reference to FIG. 5.

2.3. Modified Example

Next, Modified examples of the information processing system according to the present embodiment will be described.

2.3.1. Modified Example 1-1: Example of Control According to Context Information First, an example of control corresponding to the context information (for example, various kinds of states or situations) will be described as a Modified example 1-1 using a specific example. Further, the present description will proceed focusing on switching between the accuracy-emphasized mode and the speed-emphasized mode, similarly to the above-described embodiment.

(Control According to Situation of Speech)

For example, the information processing system may control each process related to the voice recognition or the process for presenting the voice recognition result (hereinafter also referred to collectively as a "voice recognition process") in accordance with the context information indicating the situation of speech (for example, the size of volume). As a specific example, the information processing system may select the accuracy-emphasized mode in a case in which the volume of the speech is larger than a threshold value and select the speed-emphasized mode in a case in which the volume is smaller than the threshold value.

(Control According to Quality of Voice)

Further, the information processing system may control the process related to the voice recognition in accordance with the context information indicating the quality of spoken voice. As a specific example, the information processing system may select the accuracy-emphasized mode in a case in which the spoken voice is recognized to be a child voice. Further, the information processing system may select the speed-emphasized mode in a case in which the spoken voice is recognized to be a female voice. Further, the information processing system may select the speed-emphasized mode in a case in which the spoken voice is recognized to be a male voice with a low pitch. Further, the information processing system may select the speed-emphasized mode in a case in which the spoken voice is recognized to be a voice with a higher pitch.

(Control According to Speaker)

Further, the information processing system may recognize a speaker and control the process related to the voice recognition in accordance with the speaker. In other words, the information processing system may select the accuracy-emphasized mode in a case in which the speaker is recognized to be a child. Further, the information processing system may select the speed-emphasized mode in a case in which the speaker is recognized to be an adult.

(Control According to Function Being Executed)

Further, the information processing system may control the process related to the voice recognition in accordance with a type of function (for example, an application) being executed at the time of collection of spoken voice. As a specific example, the information processing system may select the accuracy-emphasized mode in a case in which the mail function is being executed (for example, in a case in which the voice recognition result is used by the function). Further, the information processing system may select the speed-emphasized mode in a case in which a so-called instant messaging function is being executed.

(Control According to Counterpart of Communication)

Further, as another example, the information processing system may control the process related to the voice recognition in accordance with a counterpart of communication using the voice recognition result. As a specific example, the information processing system may select the accuracy-emphasized mode in a case in which the communication counterpart of the user who speaks a voice is a person corresponding to a supervisor of the user. Further, the information processing system may select the speed-emphasized mode in a case in which the communication counterpart of the user who speaks a voice is a person corresponding to a subordinate of the user.

(Control According to Operation Situation on Input Device)

Further, the information processing system may control the process related to the voice recognition in accordance with an information input situation to a keyboard, a controller, or the like. As a specific example, the information processing system may select the accuracy-emphasized mode in a case in which an operation amount of an operation on the input device is large or in a case in which an operation frequency is high. Further, the information processing system may select the speed-emphasized mode in a case in which the operation amount of the operation on the input device is small or in a case in which the operation frequency is low (Control According to Type of Device)

Further, the information processing system may control the process related to the voice recognition in accordance with the type of device (for example, input/output device) used by the user. As a specific example, the information processing system may select the accuracy-emphasized mode in a situation in which the user uses a device including no a display unit such as a display. On the other hand, the information processing system may select the speed-emphasized mode in a situation in which the user uses a device including a display unit.

(Control According to Biometric Information)

Further, the information processing system may recognize the state or the situation of the user using biometric information of the user and control the process related to the voice recognition in accordance with the recognition result. As a specific example, in a case in which the pulse is fast, it can be assumed to be a situation in which the user is nervous. Therefore, in this case, the information processing system may select the accuracy-emphasized mode. On the other hand, in a case in which the pulse is slow, it can be assumed to be a situation in which the user calms down. Therefore, in this case, the information processing system may select the speed-emphasized mode.

Further, the above-described example is merely an example, and the present disclosure is not necessarily limited to the example described above as long as the information processing system can recognize various kinds of states or situations in accordance with the acquired context information and control the process related to the voice recognition in accordance with the state or the situation. For example, the context information may be given from the user to the information processing system. As a specific example, in a case in which an operation for selecting a mode such as the accuracy-emphasized mode or the speed-emphasized mode described above is performed by the user, the information processing system may switch to the mode selected by the user.

Further, the information processing system has been described above focusing on the example of switching to either the accuracy-emphasized mode or the speed-emphasized mode, but the present disclosure is not necessarily limited to such control. As a specific example, the information processing system may control the width of the search range in the voice recognition process or the natural language process in an analog manner in accordance with the context information. Further, the information processing system may dynamically control the search range in accordance with the context information from time to time even while the process related to the voice recognition is being executed.

The example of control according to the context information (that is, various kinds of states or situations) has been described above as Modified example 1-1 using the specific example.

2.3.2. Modified Example 1-2: Example of Information Presentation Mode According to Context Information Next, an example of an information presentation mode for notifying the user of a control result (for example, a selected mode) in a case in which the information processing system according to the present embodiment controls the process related to the voice recognition in accordance with the context information will be described as Modified example 1-2 with reference to FIG. 6. FIG. 6 is an explanatory diagram for describing an overview of the information processing system according to Modified example 1-2. Further, the present description will proceed focusing on a case in which switching is performed between the accuracy-emphasized mode and the speed-emphasized mode, similarly to the above-described embodiment.

As a specific example, the information processing system may notify the user of the selected mode using a color of visual feedback. For example, in the example described above with reference to FIG. 4, the information processing system notifies the user of the selected mode in accordance with a difference in color of the display information V115 for notifying the user of the voice (sound) collection situation.

Further, as another example, the information processing system may notify the user of the selected mode in accordance with a shape of visual feedback. For example, in the example illustrated in FIG. 6, in a case in which the accuracy-emphasized mode is selected, the information processing system additionally presents an icon indicating that the mode is selected.

Further, as another example, the information processing system may express the selected mode by words. For example, in the example illustrated in FIG. 6, in a case in which the speed-emphasized mode is selected, the information processing system presents a phrase "Speak now". On the other hand, in a case in which the accuracy-emphasized mode is selected, the information processing system presents a phrase "Speak more slowly" unlike the case in which the speed-emphasized mode is selected. Further, the method of presenting each sentence to the user is not particularly limited. As a specific example, corresponding words may be presented to the user as the display information. Further, as another example, corresponding words may be presented to the user as the voice based on a technique as TTS.

Further, as another example, the information processing system may notify the user of the selected mode using sound feedback. For example, in the example illustrated in FIG. 6, the information processing system notifies the user of the selected mode by outputting effect sounds at different pitches between a case in which the speed-emphasized mode is selected and a case in which the accuracy-emphasized mode is selected.

Further, the example described above is merely an example, and the present disclosure is no particularly limited to the method of notifying the user of the selected mode or the type of device used for the notification. As a specific example, the information processing system may notify the user of the selected mode by causing an internal actuator of a device held by the user to vibrate in a different mode in accordance with the selected mode.

The example of the information presentation mode for notifying the user of the control result (for example, the selected mode) in a case in which the information processing system according to the present embodiment controls the process related to the voice recognition in accordance with the context information has been described above as Modified example 1-2 with reference to FIG. 6.

2.3.3. Modified Example 1-3: Other Application Examples

Next, another application example of the information processing system according to the present embodiment will be described as Modified example 1-3.

In the embodiment and Modified examples described above, the example in which the information processing system according to the present embodiment is applied to the voice recognition has been described. On the other hand, if the process based on the voice collection result can be controlled in accordance with the context information, content of the process is not necessarily limited to only the process related to the voice recognition.

For example, the information processing system according to the present embodiment may be applied to recording of a collected voice (that is, recording of a voice). As a specific example, the information processing system may control a recording quality in accordance with the speed of speech. In this case, for example, in a case in which the speed of speech is faster than a threshold value, the information processing system may perform control so that the recording quality further increases. On the other hand, in a case in which the speed of speech is slower than the threshold value, the information processing system may perform control so that the recording quality is lowered.

Further, the embodiments and Modified examples described above have been described mainly focusing on the example in which the control of restricting the search range in the voice recognition process or the natural language process in accordance with the state or the situation indicated by the context information, but the present disclosure is not necessarily limited to the same control. In other words, the information processing system according to the present embodiment may be controlled such that the search range in the voice recognition process or the natural language process is more restricted in accordance with the state or the situation indicated by the context information. As a specific example, in a case in which it recognized that a voice whose recognition accuracy tends to be higher is a target on the basis of the context information, the information processing system may improve the response speed by performing control such that the search range in the voice recognition process or the natural language process is more restricted.

Other application examples of the information processing system according to the present embodiment have been described above as Modified example 1-3.

2.4. Evaluation

As described above, the information processing system according to the present embodiment dynamically controls the process related to the voice recognition or the presentation mode of the voice recognition result in accordance with various kinds of states or situations (for example, the speech mode) in the period related to the voice collection. With such a configuration, for example, in a situation in which it is difficult for the user to confirm the recognition result of the spoken voice since the user concentrates on a certain task, it is possible to switch to the control in which the voice recognition accuracy is more emphasized. Therefore, the user can concentrate on the task without being conscious of the confirming of the recognition result. Further, as another example, in a situation in which the user need not pay attention to a specific task and can check the voice recognition result comfortably, it is possible to switch to the control in which the response speed is more emphasized. Therefore, the user can promptly confirm the recognition result of the voice spoken by the user.

3. Second Embodiment

3.1. Overview

Next, an information processing system according to a second embodiment of the present disclosure will be described. As described above, in recent years, UIs that enable the users to input various kinds of information by voice have become widespread. Further, application destinations of the UI are diverse, for example, like information input on a game, information input to a moving image delivery function, and the like, and various UIs are provided in accordance with usage forms. As a specific example of such a UI, for example, in order to communicate with other users in a game or the like, a UI that enables character information to be input by voice and presents an input result by voice (that is, the character information into which the voice is converted UI) in a correctable manner. For example, FIG. 7 is an explanatory diagram for describing an overview of the information processing system according to the present embodiment, and illustrates an example of a UI which enables the character information to be input by voice.

Figure 7:
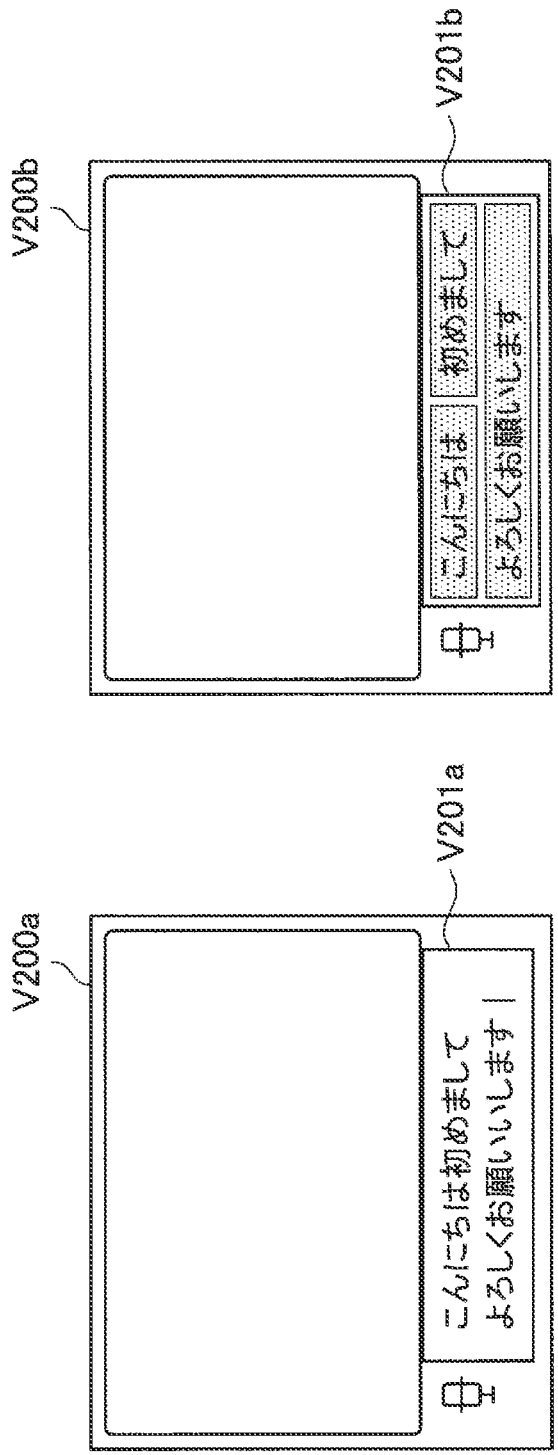
FIG. 7 is an explanatory diagram for describing an overview of an information processing system according to a second embodiment of the present disclosure.

For example, a screen V200a illustrated in a left diagram of FIG. 7 shows an example of a UI that converts the voice spoken by the user into the character information on the basis of the voice recognition process (sound analysis) or the natural language process (language analysis), and presents the character information to the user. For example, the screen V200a presents the character information into which the voice is converted to an output field indicated by reference numeral V201a in such a manner that it can be revised character by character, for example, via an input device such as a keyboard or a touch panel (that is, presents it by a method similar to general text input).

Further, as another example, a screen V200b illustrated in a right diagram of FIG. 7 shows another example of the UI that converts the voice spoken by the user into the character information and presents the character information to the user. The screen V200b presents the character information into which the voice is converted to an output field indicated by reference numeral V201b. Further, at this time, for example, the screen V200b presents the character information for each phrase of a unitary unit in a correctable manner on the basis of a result of morphological analysis or syntax analysis for the character information into which the voice is converted by the voice recognition process.

By the way, in a case in which the user is paying attention to a certain target in a situation in which the user inputs voice while performing a work such as playing a game or watching a movie or the like, it can be assumed that the user is likely to have no time to revise the voice recognition result. For this reason, in this case, for example, it is desirable to present the voice recognition result in a mode in which a correction operation is not required as much as possible. On the other hand, in a UI that does not receive correction on the voice recognition result, or in a UI that presents only a result based on the assumption that the correction operation is not performed, for example, a case in which it is difficult for the user to input an arbitrary sentence in a situation in which the user is able to input information (for example, a voice) comfortably can be assumed.

In view of the above situation, the information processing system in the present embodiment provides a UI capable of recognizing the state or the situation of the user and dynamically controlling the presentation mode of the recognition result of the voice spoken by the user (for example, the character information into which the voice is converted) in accordance with the recognition result.

For example, FIG. 8 is an explanatory diagram for describing an example of the UI provided by the information processing system according to the present embodiment. The information processing system according to the present embodiment controls the presentation mode of the voice recognition result in accordance with a degree of attention of the user related to checking of the voice recognition result and the accuracy of the voice recognition result. As a specific example, FIG. 8 illustrates an example in which the presentation mode of the voice recognition result is controlled in accordance with the degree of attention of the user to the game (that is, the degree of attention related to the checking of the voice recognition result) in a situation in which the user inputs information by voice while playing the game.

Further, in the example illustrated in FIG. 8, the user speaks "ケルベロス強 いからキュアか けてすぐ逃げて," and the information processing system recognizes "蹴るベロス強いからき ゅ 亜かけてすぐ逃げて" as the voice spoken by the user. In other words, in the example illustrated in FIG. 8, since the phrase "ケルベロス" and the phrase "キュア" in the voice spoken by the user are low in the accuracy related to the phrase recognition, an erroneous recognition result is presented for the phrases as a result.

Here, a left diagram of FIG. 8 is referred to. A screen V210a illustrated in the left diagram of FIG. 8 shows an example of a screen (UI) presented under a situation in which the user is hardly playing a game and can check the voice recognition result comfortably. Therefore, in this case, the information processing system converts the recognition result of the collected voice (that is, the character information into which the voice is converted) such as "蹴るベロス強いからきゅ 亜かけてすぐ逃げて" to an output field V211a.

Then, a center diagram in FIG. 8 is referred to. A screen V210b illustrated in the center diagram of FIG. 8 shows an example of a screen (UI) presented in a situation in which the user is paying attention to playing a game as compared with the situation illustrated in the left diagram (for example, in a situation in which the user is a little crazy about the game). In this case, for example, the information processing system, for example, presents the phrases "ケルベロス" and "キュア" with lower accuracy among the recognition results of the spoken voice as the character information (for example, hiragana) indicating the pronunciation of the phrases.

Then, a right diagram of FIG. 8 is referred to. A screen V210b illustrated on the right side of FIG. 8 shows an example of a screen (UI) presented in a situation in which the user is paying further attention to playing a game as compared with the situation illustrated in the center diagram (for example, in a situation in which the user is crazier about the game). In this case, for example, the information processing system presents all the voice recognition results as the character information indicating the pronunciation of the voice without being limited to the phrases "ケルベロス" and "キュア" with lower accuracy among the recognition results of the spoken voice.

In other words, in the example illustrated in FIG. 8, the information processing system according to the present embodiment controls the presentation mode of the phrases with the lower accuracy among the voice recognition results in accordance with, for example, the degree of attention of the user related to the checking of the voice recognition result. Further, at this time, the information processing system dynamically controls a determination criterion for controlling the presentation mode (for example, a threshold value to be compared with the accuracy) in accordance with the degree of attention.

As described above, the information processing system according to the present embodiment dynamically controls the presentation mode of at least some phrases among the voice recognition results in accordance with the context information indicating various kinds of states or situations and the accuracy related to the voice recognition. With such control, for example, even in a situation in which it is difficult for the user to check the voice recognition result comfortably, it is possible to prevent the occurrence of a situation in which understanding for the recognition result by the user is hindered since incorrect conversion results (for example, phrases having different semantic content) are presented. Further, even in a situation in which at least some phrases of the character information into which the voice is converted are corrected, it is possible to correct phrases which are more easily targets as compared with a case in which phrases serving as targets are corrected in a situation in which an erroneous conversion result is presented. Further, the information presented on the basis of the voice recognition result (for example, the character information into which the voice is converted) corresponds to an example of "output information related to voice collection."

Further, the information processing system according to the present embodiment may control the presentation mode of at least some phrases among the voice recognition results in accordance with a state of a voice collection environment.

As a specific example, in a case in which an influence of ambient noise is large (for example, in a case in which a volume of noise is large), the accuracy of voice recognition may be lowered, and an error may occur in voice recognition. The errors occurring at the time of voice recognition can also be a factor of increasing the correction for the voice recognition result. For this reason, for example, the information processing system may present at least some phrases (for example, phrases with lower accuracy) among the voice recognition results as the character information indicating the pronunciation of the phrases in accordance with the magnitude of the influence of the ambient noise. Of course, the information processing system may present all the voice recognition results as the character information indicating the pronunciation of the voice in a case in which the influence of the ambient noise is large.

The overview of the information processing system according to the present embodiment has been described above with reference to FIGS. 7 and 8. Further, the information processing system according to the present embodiment will be described below in further detail.

3.2. Basic Principle

First, a mechanism of dynamically controlling the presentation mode of at least some phrases among the voice recognition results in accordance with the context information indicating various kinds of states or situations and the accuracy related to the voice recognition in the information processing system according to the present embodiment will be described in further detail.

As described above, the information processing system according to the present embodiment controls the presentation mode of phrases which are low in the accuracy related to the voice recognition in accordance with the degree of attention of the user related to the checking of the voice recognition result. Further, the information processing system may control the presentation mode of at least some phrases among the voice recognition results in accordance with the state of the voice collection environment.

Further, a situation in which the information processing system intentionally controls the presentation mode of the voice recognition result on the basis of an instruction from the user (hereinafter also referred to as "user control") can be assumed. As a specific example, a case in which in a situation in which a new word which is generally low in awareness is spoken, the user assumes that the new word is erroneously converted and desires presentation of the character information of the pronunciation of the voice as the voice recognition result can be assumed. In view of such a situation, the information processing system may control the presentation mode of the voice recognition result on the basis of the user control.

On the basis of the above description, the information processing system according to the present embodiment calculates a coefficient t on the basis of a calculation formula indicated by Formula 1 below, compares the coefficient t with the accuracy related to the voice recognition, and controls the presentation mode of at least some phrases among the voice recognition result.

[Math. 1]

$$t = \alpha + \beta + \gamma$$

$$0 \leq \alpha \leq 1,\ 0 \leq \beta \leq 1,\ \gamma = 0, 1 \quad \text{(Formula 1)}$$

Figure 9:
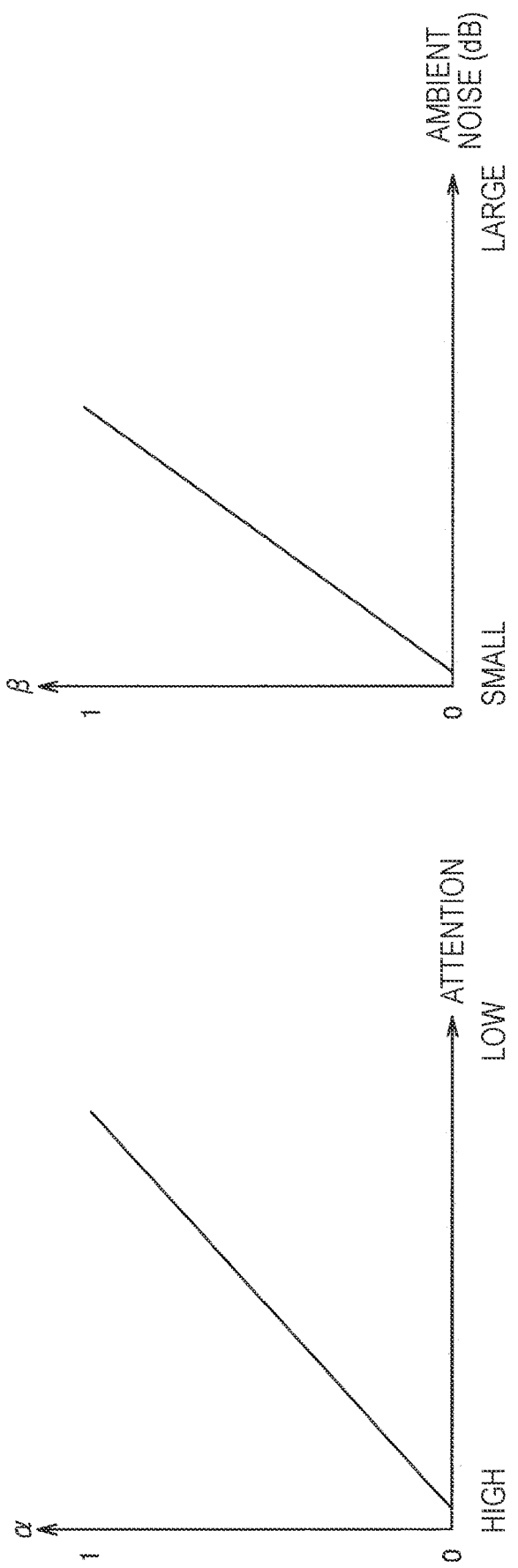
FIG. 9 is an explanatory diagram for describing the details of an operation of an information processing system according to the embodiment.

In Formula 1, $\alpha$ indicates a variable corresponding to the degree of attention of the user related to the checking of the voice recognition result. Further, $\beta$ indicates a variable corresponding to the state of the voice collection environment. For example, FIG. 9 is an explanatory diagram for describing the details of an operation of the information processing system according to the present embodiment, and illustrates an example of characteristics of the variables $\alpha$ and $\beta$. A left diagram of FIG. 9 is a graph illustrating a characteristic of the variable $\alpha$. In the graph illustrating the characteristic of the variable $\alpha$, a vertical axis indicates a value of $\alpha$, and a horizontal axis indicates the degree of attention of the user related to the checking of the voice recognition result. Further, a right diagram of FIG. 9 is a graph illustrating a characteristic of the variable $\beta$. In the graph illustrating the characteristic of the variable $\beta$, a vertical axis illustrates a value of $\beta$, and a horizontal axis indicates the magnitude of the influence of the factor of inhibiting the voice collection in the voice collection environment. As illustrated in FIG. 9, the variable $\alpha$ has a higher value as the attention of the user related to the checking of the voice recognition result is lowered. Further, the variable $\beta$ has a higher value as the influence of factors of inhibiting the voice collection is increased, for example, in a case in which the influence of the noise is large.

Further, $\gamma$ indicates a variable corresponding to the user control, and indicates 1 in a case in which there is an instruction from the user and 0 in a case in which there is no instruction from the user. Further, the accuracy of the voice recognition is assumed to have a value between 0.0 and 1.0.

On the basis of the above description, the information processing system according to the present embodiment recognizes the degree of attention of the user, the state of the voice collection environment, and the presence or absence of the user control related to the checking of the voice recognition result, and calculates the coefficient t on the basis of the recognition result. Then, the information processing system compares the accuracy related to the recognition of the phrase for at least some phrases included in the voice recognition result with the calculated coefficient t, and controls the presentation mode of the phrase in accordance with the comparison result.

As a specific example, it is assumed that the accuracy related to recognition of a target phrase is "0.7." At this time, in a case in which the calculated coefficient t is "0.2," the information processing system presents the target phrase as, for example, the character information in which even the semantic content is considered (for example, a sentence including kanji in Japanese) on the basis of the result of the voice recognition process or the natural language process. On the other hand, in a case in which the calculated coefficient t is "0.9," the information processing system presents the target phrase in a mode different from the result of the voice recognition process or the natural language process result for the phrase (that is, controls the presentation mode of the phrase). As a specific example, the information processing system presents the target phrase as the character information indicating the pronunciation of the phrase (for example, hiragana sentence in Japanese).

Further, the variables $\alpha$, $\beta$, and $\beta$ are added respectively, as indicated in Formula 1. Therefore, in a case in which at least one of the variables is "1.0," the calculated coefficient t indicates a larger value than the accuracy of the target phrase regardless of the value of the other variables. In other words, in this case, the target phrase is presented as, for example, the character information indicating the pronunciation of the phrase.

Figure 10:
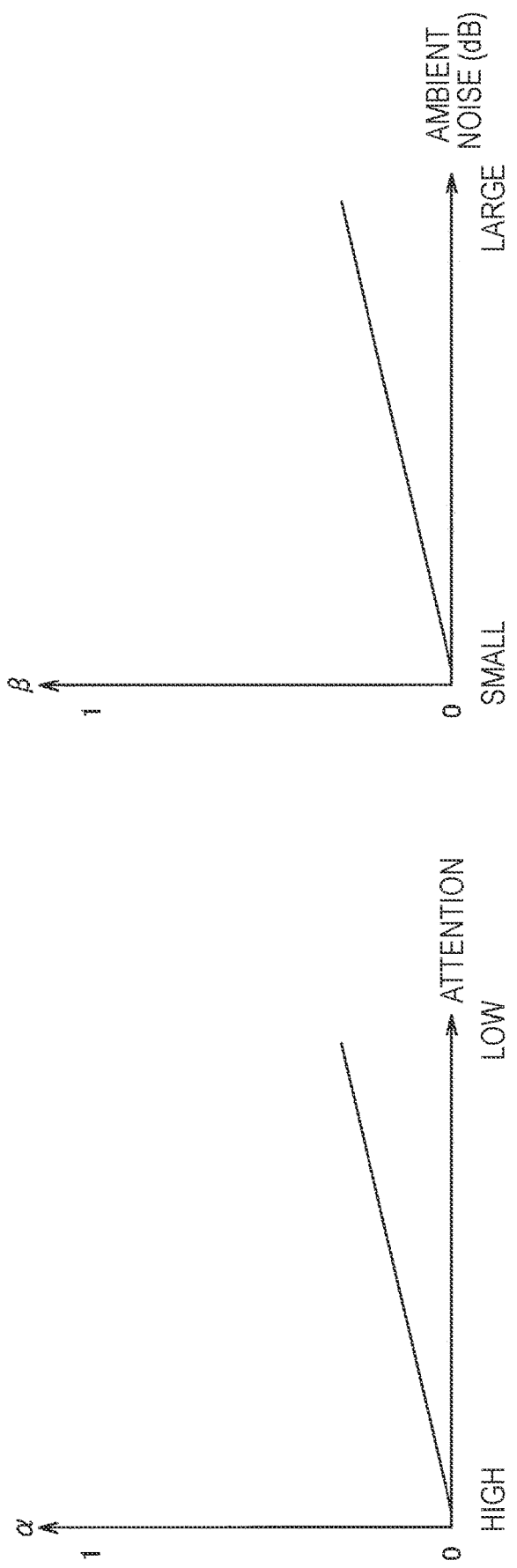
FIG. 10 is an explanatory diagram for describing the details of an operation of an information processing system according to the embodiment.

Further, the characteristics of the variables $\alpha$ and $\beta$ may be appropriately changed in accordance with the use situation or the use case of the information processing system. For example, FIG. 10 is an explanatory diagram for describing the details of the operation of the information processing system according to the present embodiment, and illustrates another example of the characteristics of the variables $\alpha$ and β. In the example illustrated in FIG. 10, for example, the characteristics of the variables α and β are set within a range in which an addition result of the variables α and β does not exceed "1.0." In other words, in the example illustrated in FIG. 10, the coefficient t does not have a value of "1.0" or more only with the values of the variables α and β and can have a value of "1.0" or more only in a case in which there is user control.

The mechanism of dynamically controlling the presentation mode of at least some phrases among the voice recognition results in accordance with the context information indicating various kinds of states or situations and the accuracy related to the voice recognition in the information processing system according to the present embodiment has been described above with reference to FIGS. 9 and 10.

3.3. Process

Figure 11:
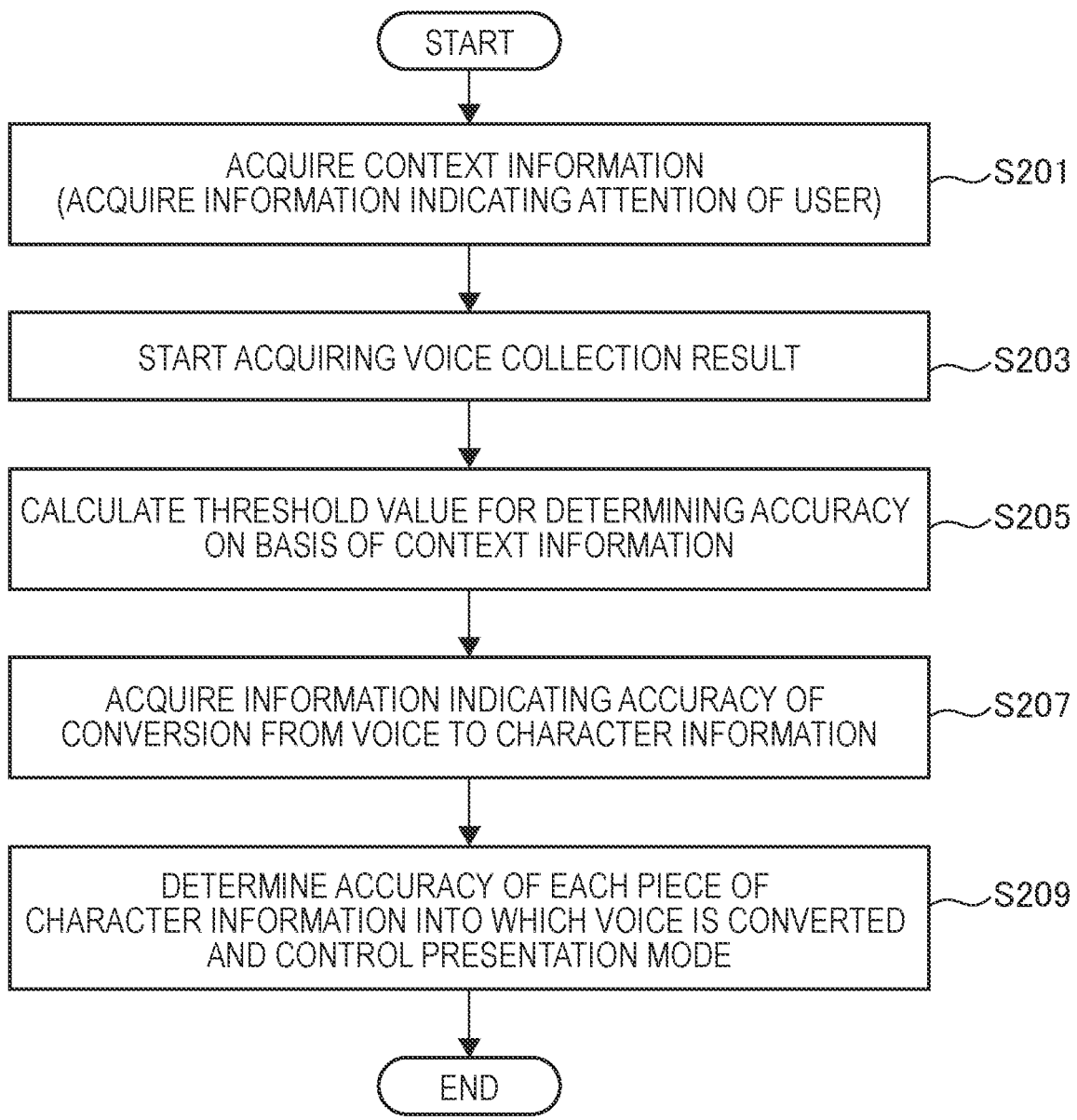
FIG. 11 is a flowchart illustrating an example of a flow of a series of processes of the information processing system according to the embodiment.

Next, an example of a flow of a series of processes of the information processing system according to the present embodiment will be described with reference to FIG. 11. FIG. 11 is a flowchart illustrating an example of a flow of a series of processes of the information processing system according to the present embodiment.

As illustrated in FIG. 11, the input/output device 30 (for example, the sensing unit 313) acquires the context information indicating the degree of attention of the user related to the checking of the voice recognition result or the context information indicating the state of the voice collection environment. Then, the input/output device 30 transmits the acquired context information to the information processing device 10 (S201). Further, if a predetermined event (for example, an operation for speech in PTT) is detected, the input/output device 30 (the sound collection unit 311) detects collects the voice spoken by the user and outputs a sound signal based on the collection result of the voice signal to the information processing device 10 (S203).

The information processing device 10 (the context analysis unit 109) acquires the context information from the input/output device 30, analyzes the acquired context information, and recognizes a predetermined state or situation in the period related to the voice collection. As a specific example, the information processing device 10 recognizes the degree of attention of the user related to the checking of the voice recognition result or the state of the voice collection environment on the basis of the acquired context information. Then, the information processing device 10 calculates a threshold value (that is, the coefficient t indicated by Formula 1) used for determining the accuracy of the voice recognition result in accordance with the recognition results of various kinds of states or situations (S205).

Further, the information processing device 10 (the output control unit 111) acquires the accuracy related to the conversion from the voice into the character information (that is, the accuracy of the voice recognition result) on the basis of the result of the voice recognition process (sound analysis) or the natural language process (language analysis) for the sound signal based on the voice collection result (S207).

Further, on the basis of the calculated threshold value, the information processing device 10 (the output control unit 111) determines the accuracy of each phrase included in the character information into which the voice is converted, and controls the presentation mode of the phrase in accordance with a determination result. As a specific example, the information processing device 10 sets the presentation mode of the phrase so that the character information indicating the pronunciation of the phrase for the phrase having accuracy lower than the threshold value as is presented as the recognition result of the phrase (S209).

The example of the flow of a series of processes of the information processing system according to the present embodiment has been described above with reference to FIG. 11.

3.4. Modified Examples

Next, Modified examples of the information processing system according to the present embodiment will be described.

3.4.1. Modified Example 2-1: Example of Display Control

Figures 12, 13:
FIG. 12 is an explanatory diagram for describing an overview of an information processing system according to Modified example 2-1.
FIG. 13 is an explanatory diagram for describing an overview of an information processing system according to Modified example 2-2.

First, an example of control related to display of the recognition result in a case in which the information processing system according to the present embodiment controls the presentation mode of at least some phrases of the voice recognition result will be described as Modified example 2-1 with reference to FIG. 12. FIG. 12 is an explanatory diagram for describing an overview of the information processing system according to Modified example 2-1.

As described above, the information processing system according to the present embodiment controls presentation mode of at least some phrases among the voice recognition results, for example, in accordance with the degree of attention of the user related to the checking of the voice recognition result or the state of the voice collection environment. For this reason, in this case, for example, the information processing system may give a notification indicating that the presentation mode of the phrase is controlled to the user by emphasizing and displaying the phrase whose presentation mode is controlled when the voice recognition result is displayed and presented to the user.

For example, as indicated by reference numeral V211$d$, the information processing system may emphasize the phrase by enclosing the phrase serving as the presentation mode control target with double quotations. Further, as another example, as indicated by reference numeral V211$e$, the information processing system may emphasize the phrase by underlining the phrase serving as the presentation mode control target. Further, as another example, as indicated by reference numeral V211$f$, the information processing system may emphasize the phrase by controlling a size, a thickness, a color, a density, or the like of text of the phrase serving as the presentation mode control target. Further, as another example, as indicated by reference numeral V211$g$, the information processing system may emphasize the phrase by inserting a blank before and after the phrase serving as the presentation mode control target.

With the above control, the user can intuitively recognize the phrase serving as the presentation mode control target among the recognition result of the presented voice. Further, the example illustrated in FIG. 12 is merely an example, and a method thereof is not particularly limited as long as it is possible to emphasize the phrase serving as the presentation mode control target.

The example of control related to display of the recognition result in a case in which the information processing system according to the present embodiment controls the presentation mode of at least some phrases of the voice recognition result has been described above as Modified example 2-1 with reference to FIG. 12.

3.4.2. Modified Example 2-2: Control Example in Case in Which English Voice is Recognized Next, an example of control in a case in which the information processing system according to the present embodiment recognizes a voice spoken in English will be described as Modified example 2-2 with reference to FIG. 13. FIG. 13 is an explanatory diagram for describing an overview of the information processing system according to Modified example 2-2.

English does have a concept in which kanji and hiragana in the case of Japanese are differently used. For this reason, in a case in which the recognition result of an English voice is presented, it is difficult to perform control such that switching is performed between a sentence including kanji and a hiragana sentence as in Japanese.

In this regard, the information processing system according to Modified example 2-2 may present the phrase in an original form or a singular form in a case in which the accuracy related to the recognition for some phrases included in the recognition result are low in a situation in which the recognition result of the English voice is presented.

For example, FIG. 13 illustrates an example of control in which the accuracy related to the recognition for a phrase (word) "items" in the recognized voice in a situation in which the user speaks "I got rare items" in English, and the information processing system recognizes the spoken voice. In this case, as illustrated in FIG. 13, the information processing system presents "item" which is the original form (singular form) of the phrase as the recognition result of the phrase "items" which is low in the accuracy related to the voice recognition.

Further, at this time, similarly to the example described in Modified example 2-1, the information processing system may give a notification indicating that the presentation mode of the phrase is controlled to the user by emphasizing and displaying the phrase whose presentation mode is controlled.

The example of control in a case in which the information processing system according to the present embodiment recognizes a voice spoken in English has been described above as Modified example 2-2 with reference to FIG. 13.

3.4.3. Modified Example 2-3: Other Control Examples

Then, other examples of control in a case in which the accuracy related to the voice recognition is low will be described as another Modified example 2-3.

As described above, the information processing system according to the present embodiment collects the voice of Japanese, and outputs the character information indicating the pronunciation of the voice such as hiragana as the voice recognition result in a case in which the accuracy related to the voice recognition is low. On the other hand, in a case in which a sentence presented only with hiragana is visually recognized, it tends to be difficult to understand semantic content thereof as compared with a case in which a sentence including kanji is visually recognized.

In view of such a situation, the information processing system according to Modified example 2-3 may output a voice based on the technique such as the TTS as the voice recognition result, for example, in a situation in which the phrases presented with hiragana are increased more with the control of the presentation mode. With such control, it is easier for the user to understand the voice recognition result as compared with the case in which the user visually recognizes the sentence presented with hiragana.

As a more specific example, a situation in which the user communicates with other users via the network is considered. In this case, in a case in which it is recognized that the character information into which the voice is converted has more phrases presented with hiragana on the basis of the recognition result of the voice spoken by the user, the information processing system converts the character information into a voice and presents the voice to the user. Further, even in a case in which the recognition result of the voice of another user is presented, the information processing system may convert the character information into a voice and present the voice to the user in a case in which it is recognized that the character information into which the voice is converted has more phrases presented with hiragana.

Further, in a case in which the character information is converted into a voice, and the voice is output, the information processing system may give a notification indicating that the character information is converted into a voice, and the voice is output on the basis of predetermined notification information. As a specific example, the information processing system may give the user a notification indicating that the character information is converted into a voice, and the voice is output by controlling the presentation mode (for example, a color, a thickness, a density, or the like) of the character information into which the voice is converted.

Then, other examples of control in a case in which the accuracy related to the voice recognition is low have been described above as another Modified example 2-3.

3.5. Evaluation

As described above, the information processing system according to the present embodiment dynamically controls the presentation mode of at least some phrases among the voice recognition results in accordance with the context information indicating various kinds of states or situations and the accuracy related to the voice recognition. With such control, for example, even in a situation in which it is difficult for the user to check the voice recognition result comfortably, it is possible to prevent the occurrence of a situation in which understanding for the recognition result by the user is hindered since incorrect conversion results (for example, phrases having different semantic content) are presented. Further, even in a situation in which at least some phrases of the character information into which the voice is converted are corrected, it is possible to correct phrases which are more easily targets as compared with a case in which phrases serving as targets are corrected in a situation in which an erroneous conversion result is presented.

Further, the information processing system according to the present embodiment may be combined with the information processing system according to the first embodiment described above. As a specific example, the information processing system may control the search range in the voice recognition process or the natural language process and the presentation mode of the voice recognition result in accordance with various kinds of states or situations indicated by the acquired context information.

4. Third Embodiment

4.1. Overview

Next, an information processing system in accordance with a third embodiment of the present disclosure will be described. Among systems that recognize a voice spoken by the user, there is a system that provides a UI for feeding an execution situation of the process related to the voice recognition back to the user. As a specific example, there is a UI that measures a volume of voice (sound) collected by a sound collection unit such as a microphone and presents a measurement result of the volume as display information of, for example, a volume meter in real time. With the provision of such a UI, the user can intuitively (visually) recognize that the voice spoken by the user is recognized by the system.

On the other hand, the UI that feeds the measurement result of the volume of the voice collected by the sound collection unit back to the user need not necessarily effectively function in a situation in which the influence of a noise such as an ambient environmental sound or the like is large. Specifically, a noise collected by the sound collection unit may be collected, and the measurement result of the volume of the noise may be fed back to the user, and in this case, it is difficult for the user to determine which of the speech of the user and the ambient noise is a sound corresponding to the collection result. As a result, it is difficult for the user to determine whether or not the voice spoken by the user is recognized by the system.

On the other hand, for example, there is a method of feeding information back to the user on in a case in which the voice is recognized on the basis of the result of the recognition process for the voice collection result. However, in general, the voice recognition process tends to take a long time to process since the throughput is large, and in many cases, it takes time until information is fed back to the user after the user speaks.

In view of the above situation, the information processing system according to the present embodiment identifies the voice and the noise and presents a UI capable of notifying the user of information at an earlier timing in a case in which the voice is collected. For example, FIG. 14 is an explanatory diagram for describing an overview of the information processing system according to the present embodiment.

Figure 14:
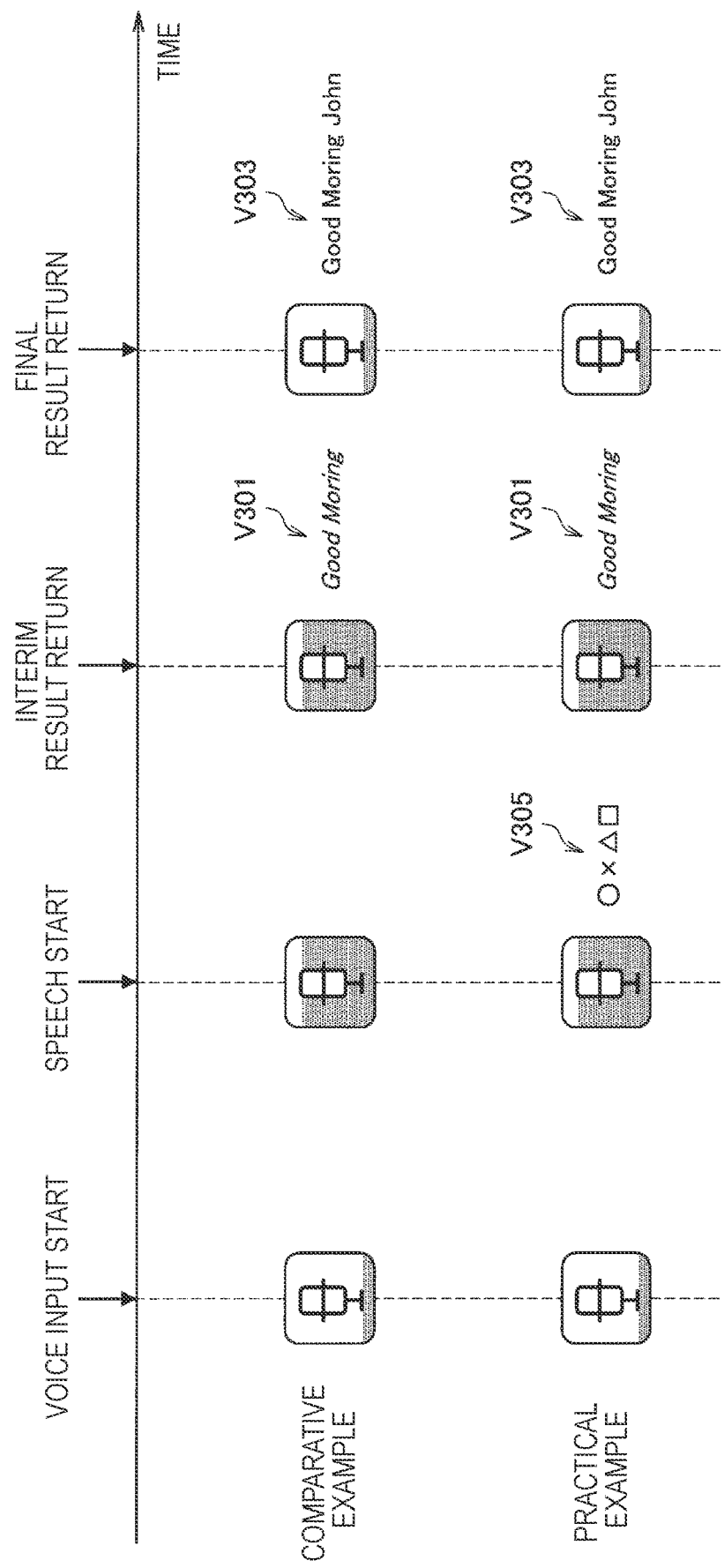
FIG. 14 is an explanatory diagram for describing an overview of an information processing system according to a third embodiment of the present disclosure.

In FIG. 14, in an example illustrated as a comparative example in an upper portion, a feedback timing in a case in which information is fed back to the user on the basis of the result of the recognition process for the voice collection result is schematically illustrated. Further, in the example illustrated as a practical example in a lower portion, an example of a timing of feeding information back to the user in a case in which the information processing system according to the present embodiment collects the voice is illustrated.

First, the description will proceed focusing on the comparative example illustrated in FIG. 14. If the information processing system starts acquiring a voice input (for example, collecting a voice), and the user starts speaking toward the sound collection unit, the voice spoken by the user is sequentially collected in the information processing system. The information processing system according to the comparative example sequentially executes the recognition process for the collected voice, and if the result of the recognition process is acquired for at least some voices, the information processing system presents output information V301 based on the result of the recognition process to the user as an interim result. Then, if the recognition process (for example, the voice recognition process or the natural language process) for a series of collected voices is completed, the information processing system presents output information V303 based on the result of each process to the user as a final result. As described above, in the information processing system in accordance with the comparative example, there are cases in which a time lag occurs until information is fed back to the user after the user speaks a voice.

Next, the description will proceed focusing on the practical example illustrated in FIG. 14. If a sound signal based on the collection result of the voice spoken by the user is acquired, the information processing system according to the present embodiment detects (extracts) a voice signal included in the sound signal on the basis of the technique such as VAD. Then, upon detecting the voice signal included in the acquired sound signal, the information processing system presents notification information V305 to the user. Further, thereafter, similarly to the information processing system in accordance with the comparative example, the information processing system according to the practical example sequentially executes the recognition process for the collected voice, and presents output information V303 to the user as an interim result in accordance with the result of the recognition process. Then, if the recognition process for example, the voice recognition process or the natural language process) for a series of collected voices is completed, the information processing system according to the practical example presents the output information V303 based on the result of each process to the user as a final result.

As described above, the information processing system according to the present embodiment can present the notification information V305 to the user at an earlier timing than a timing at which the output information V301 based on the recognition process result of the collected voice is presented. Further, since the notification information V305 is presented to the user on the basis of the detection result of the voice signal included in the collected sound signal, in a case in which only ambient noise is collected, the notification information V305 is not presented to the user. With such a configuration, the information processing system according to the present embodiment can identify the voice and the noise and notify the user of information at an earlier timing in a case in which the voice is collected.

The overview of the information processing system according to the present embodiment has been described above with reference to FIG. 14. Further, the information processing system according to the present embodiment will be described below in further detail.

4.2. Process

Figure 15:
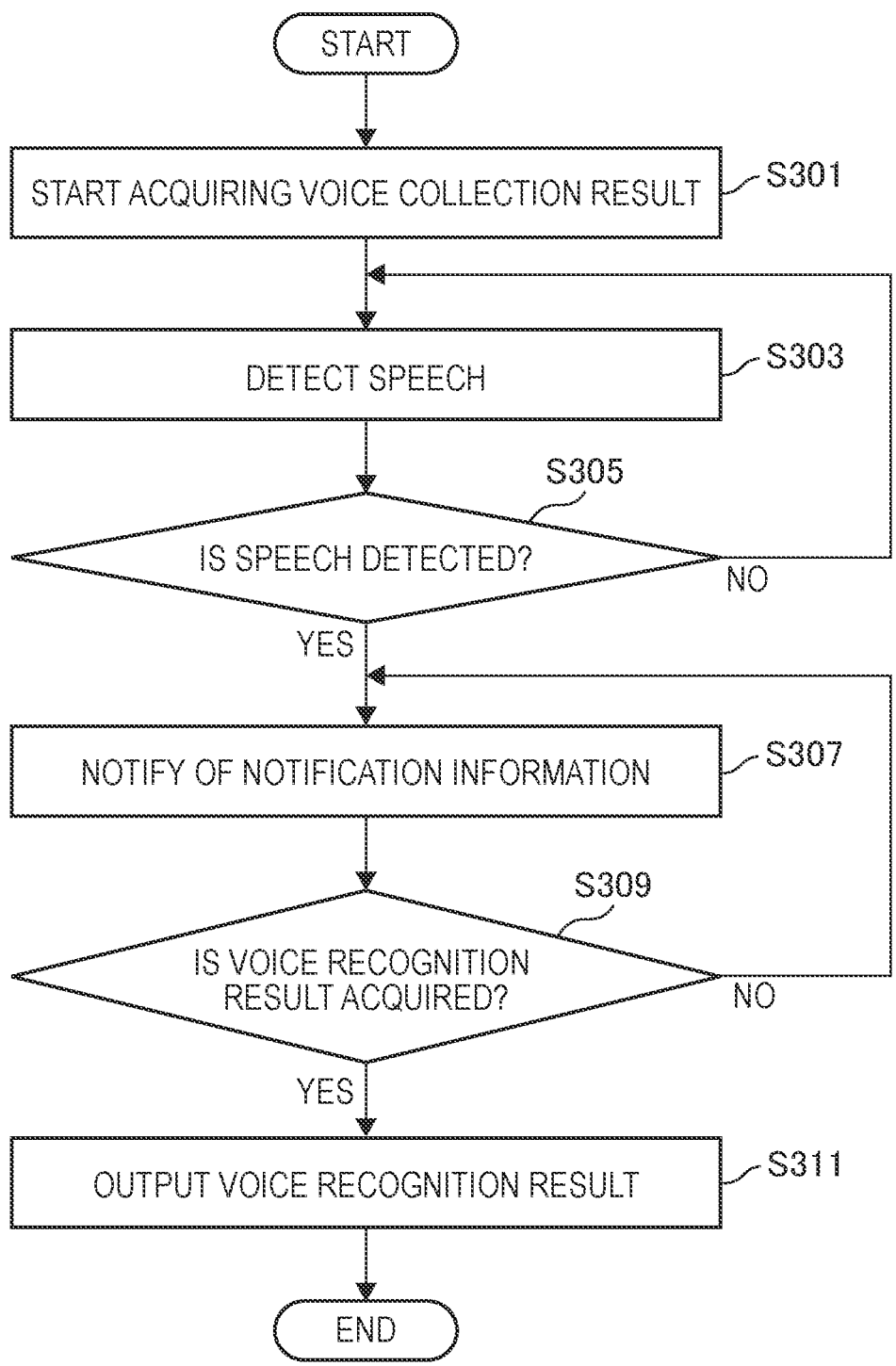
FIG. 15 is a flowchart illustrating an example of a flow of a series of processes of the information processing system according to the embodiment.

Next, an example of a flow of a series of processes of the information processing system according to the present embodiment will be described with reference to FIG. 15. FIG. 15 is a flowchart illustrating an example of a flow of a series of processes of the information processing system according to the present embodiment.

As illustrated in FIG. 15, in a case in which the voice collection is started, the information processing device 10 starts acquiring the sound signal on the basis of the sound collection result by the sound collection unit 311 from the input/output device 30 (S301). Further, the information processing device 10 (the voice detecting unit 103) extracts the voice signal included in the sound signal acquired from the input/output device 30 on the basis of the technique such as VAD, and detects the speech of the user (S303). As described above, the information processing device 10 sequentially executes the detection of the speech of the user on the basis of the extraction of the voice signal from the sound signal sequentially acquired from the input/output device 30 (NO in S305).

Further, in a case in which the speech of the user is detected (YES in S305), the information processing device 10 (the output control unit 111) gives a notification indicating that the speech is detected to the user by presenting the notification information to the input/output device 30 (S307).

Then, the information processing device 10 (the voice recognition processing unit 105) executes the voice recognition process on the voice signal extracted from the sound signal, and converts the voice signal into the character information indicating the pronunciation of the voice. Further, the information processing device 10 (the output control unit 111) may cause the input/output device 30 to continuously present the notification information until the result of the voice recognition process is acquired (NO in S309).

Further, in a case in which the result of the voice recognition process for the voice signal is acquired, the information processing device 10 (the output control unit 111) causes the input/output device 30 to present information based on the result of the voice recognition process (for example, the character information into which the voice is converted) (S311). Further, the information processing device 10 (the output control unit 111) may execute the natural language process on the result of the voice recognition process and cause the input/output device 30 to present the information indicating the voice recognition result on the basis of the result of the natural language process.

The example of the flow of a series of processes of the information processing system according to the present embodiment has been described above with reference to FIG. 15.

4.3. Modified Examples

Next, Modified examples of the information processing system according to the present embodiment will be described.

4.3.1. Modified Example 3-1: Example of Notification Information

Figure 16:
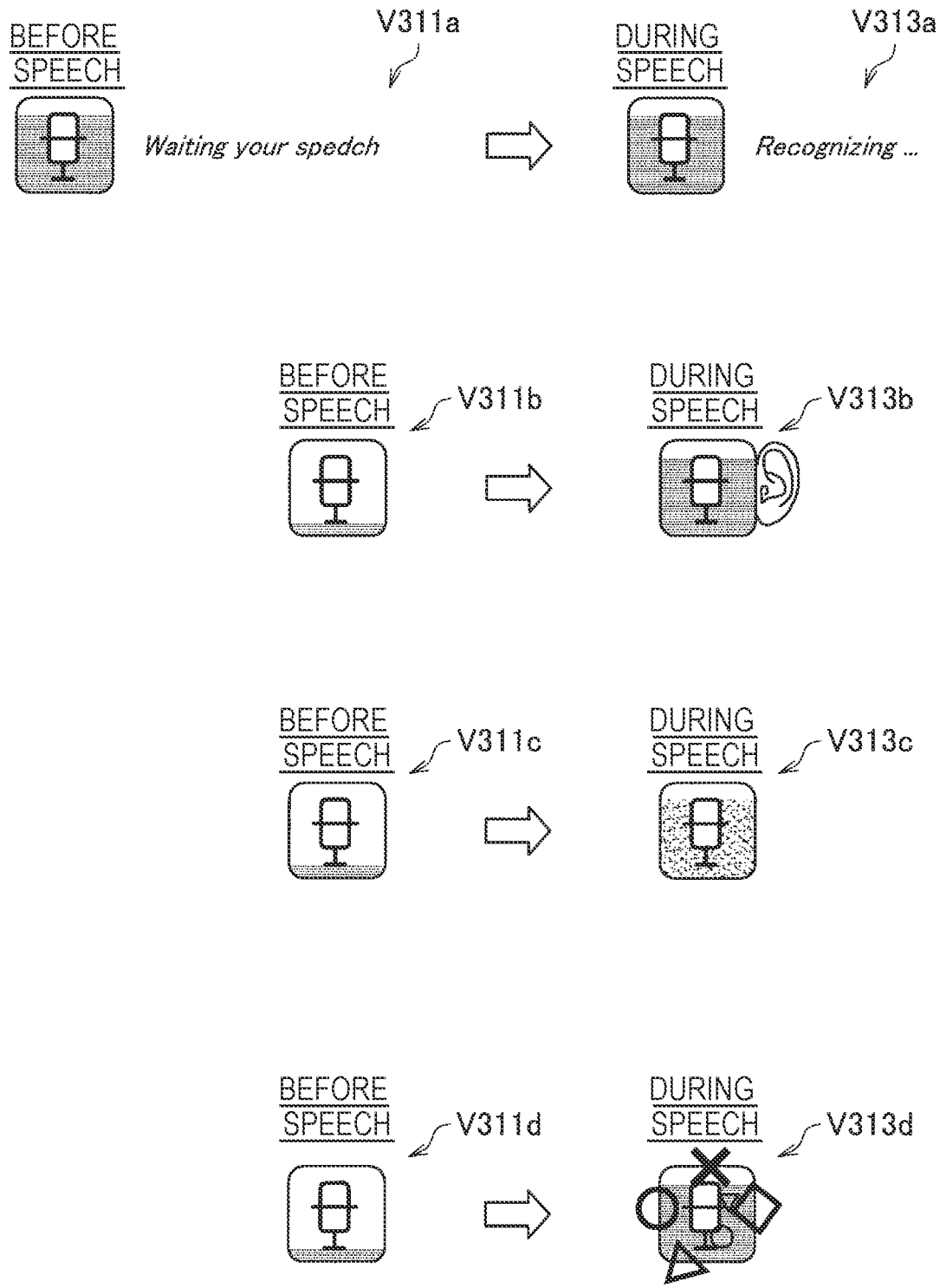
FIG. 16 is an explanatory diagram for describing an overview of an information processing system according to Modified Example 3-1, and illustrates an example of notification information.

First, an example of the notification information presented to the user on the basis of the detection result of the speech (voice) by the information processing system according to the present embodiment will be described as Modified example 3-1 with reference to FIG. 16. FIG. 16 is an explanatory diagram for describing an overview of the information processing system according to Modified example 3-1, and illustrates an example of the notification information.

(Presentation of State by Words)

For example, the information processing system notifies the user of each state (hereinafter also referred to as a "speech detection state") of a state in which the speech is detected and a state in which the speech is not detected by presenting words. For example, reference numerals V311a and V313a in FIG. 16 indicate examples of display information for notifying of the speech detection state by presenting words. Further, the reference numeral V311a indicates a state before speech (that is, the state in which the speech is not detected). Further, reference numeral V313a indicates a state during speech (that is, the state in which the speech is detected). In this case, the information processing system presents words "waiting your speech" in the state before speech, and presents words "recognizing . . . " in the state during speech. As a result, the user can recognize whether or not the speech of the user is detected in accordance with the presented words.

(Presentation of State by Change of Icon)

Further, the information processing system may notify the user of the speech detection state by changing display information such as an icon. For example, reference numerals V311b and V313b in FIG. 16 indicate examples of display information for notifying of the speech detection state by changing the display information such as the icon. Further, reference numeral V311b indicates the state before speech. Further, reference numeral V313b indicates the state during speech. In this case, the information processing system presents a microphone icon in the state before speech, and changes the microphone icon to an icon in which the microphone icon is added to an ear image. As a result, the user can recognize whether or not the speech of the is detected in accordance with the presented icon.

(Presentation of State by Color of Icon)

Further, the information processing system may notify the user of the speech detection state by changing a color of display information such as an icon. For example, reference numerals V311c and V313c in FIG. 16 indicate examples of display information for notifying the speech detection state by changing the color of the display information such as the icon. Further, reference numeral V311c indicates the state before speech. Further, reference numeral V313c indicates the state in speech. In this case, the information processing system presents the microphone icon in a different color between the state before speech and the state before speech. As a result, the user can recognize whether or not the speech of the user is detected in accordance with the color of the presented icon.

(Presentation of State by Animation)

Further, the information processing system may notify the user of the speech detection state by using animation display. For example, reference numerals V311d and V313d in FIG. 16 indicate examples of display information for notifying the speech detection state by animation display. Further, reference numeral V311d indicates the state before speech. Further, reference numeral V313d indicates the state during speech. In this case, if the speech is detected, the information processing system presents, for example, an animation in which symbols are sucked into the microphone icon. As a result, the user can recognize whether or not the speech of the user is detected in accordance with the presence/absence of the presentation of animation.

Further, the example described above with reference to FIG. 16 is merely an example, and a method thereof and a type of device used for the notification of the notification information are not particularly limited as long as it is possible to notify the user of the speech detection state. As a specific example, the information processing system may notify the user of the speech detection state by outputting a sound such as a sound effect from a sound output unit such as a speaker. Further, as another example, the information processing system may notify the user of the speech detection state by vibration by driving an actuator of a device held by the user.

The example of the notification information presented to the user on the basis of the detection result of speech (voice) by the information processing system according to the present embodiment has been described above as Modified example 3-1 with reference to FIG. 16.

4.3.2. Modified Example 3-2: Presentation Example of Voice Recognition State Next, an example of a UI for presenting the recognition state of the spoken voice to the user in addition to the speech detection state will be described as Modified example 3-2.

For example, FIG. 17 is an explanatory diagram for describing an example of a UI provided by the information processing system according to Modified example 3-2, and illustrates an example of a UI in a case in which information is presented to the user step by step in accordance with the voice recognition result after notifying of the speech detection state. In the example illustrated in FIG. 17, the information processing system notifies of the notification information on the basis of the sound model obtained in the process of sound analysis for the voice signal.

Specifically, the information processing system executes the sound analysis on the voice signal, and if data of a sound model of the voice signal is acquired, the information processing system presents output information V321 based on the sound model (for example, the information indicating the pronunciation of the voice) to the user. Further, thereafter, in a case in which the voice recognition result based on the data of the sound model is acquired, the information processing system sequentially presents output information V323 based on the recognition result as an intermediate result. Further, if the voice recognition process or the natural language process for a series of voice is completed, the information processing system presents output information V325 based on the basis of the result of each process to the user as a final result.

Further, in a situation in which a voice indicating a relatively long sentence is recognized, presentation of the output information V321 based on the sound model described above and presentation of the output information V323 based on the voice recognition result may be executed step by step. For example, FIG. 18 is an explanatory diagram for describing another example of a UI provided by the information processing system according to Modified example 3-2. FIG. 18 illustrates an example in which the user speaks "Oh I'm going to join the party tonight," and the information processing system presents information based on the recognition result of the voice spoken by the user.

First, if the sound analysis is executed on the voice "Oh I'm," the information processing system presents the user with output information V331 indicating the pronunciation of the voice on the basis of data of the sound model data obtained as the result of the sound analysis as illustrated in a first stage diagram. Further, if the voice recognition result based on the data of the sound model is acquired, the information processing system replaces the already presented output information V331 with output information V333 indicating the phrase "Oh I'm" on the basis of the recognition result, and presents the output information V333 as an interim result as illustrated in a second stage diagram.

Then, if the sound analysis is executed on the voice "going to join" which is subsequently input, the information processing system presents output information V335 indicating the pronunciation of the voice, subsequently to the already presented phrase "Oh I'm" on the basis of the data of the sound model obtained as the result of the sound analysis as illustrated in a third stage diagram. Further, if the voice recognition result based on the data of the sound model is acquired, the information processing system replaces the already presented output information V335 with output information V337 indicating the phrase "going to join", and presents the output information V337 as an interim result as illustrated in a fourth stage diagram on the basis of the recognition result.

The information processing system executes the above control on the basis of the sequentially input voice, and if the voice recognition process or the natural language process for a series of voices is completed, the information processing system outputs output information V329 based on the result of each process to the user as a final result. For example, in the example illustrated in FIG. 18, the information processing system presents the output information V329 indicating the sentence "Oh I'm going to join the party tonight" as the recognition result of the voice spoken by the user.

As described above, the information processing system according to Modified example 3-2 presents the output information on the basis of the data of the sound model of the voice until the output information based on the recognition result of the spoken voice is presented after the notification information based on the speech detection result is presented. With such control, since the period in which the presented output information is not updated is shorter, the user can recognize the state or the situation related to the recognition of the voice spoken by the user in a more preferable mode.

The example of the UI for presenting the recognition state of the spoken voice to the user in addition to the speech detection state has been described above as Modified example 3-2 with reference to FIGS. 17 and 18.

4.4. Evaluation

As described above, the information processing system according to the present embodiment detects (extracts) the voice signal included in the sound signal based on the voice collection result on the basis of the technique such as VAD, and presents the notification information to the user on the basis of the detection result. As described above, the information processing system according to the present embodiment can present the notification information to the user at an earlier timing than a timing at which the output information based on the recognition process result of the collected voice is presented. Further, since the notification information is presented to the user on the basis of the detection result of the voice signal included in the collected sound signal, in a case in which only ambient noise is collected, the notification information is not presented to the user. With such a configuration, the information processing system according to the present embodiment can identify the voice and the noise and notify the user of information at an earlier timing in a case in which the voice is collected.

Further, the information processing system according to the present embodiment may be combined with the information processing system in accordance with the first and second embodiments described above. As a specific example, the information processing system may notify of the notification information on the basis of the voice detection result and control the search range in accordance with various kinds of states or situations indicated by the acquired context information when the voice recognition process or the natural language process is executed on the voice. Further, at this time, when the output information is presented on the basis of the voice recognition result, the information processing system may control the presentation mode of the output information in accordance with various kinds of states or situations indicated by the acquired context information.

5. Hardware Configuration

Next, a hardware configuration of the information processing device 900 constituting the information processing system 1 according to the present embodiment such as the information processing devices 10 and 20 and the input/output device 30 described above will be described with reference to FIG. 19. FIG. 19 is a functional block diagram illustrating an example of the hardware configuration of the information processing device 900 constituting the information processing system 1 according to one embodiment of the present disclosure.

The information processing device 900 included in the information processing system 1 according to the present embodiment mainly includes a CPU 901, a ROM 903, and a RAM 905. Furthermore, the information processing device 900 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing device and a control device, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 primarily stores programs that the CPU 901 uses and parameters and the like varying as appropriate during the execution of the programs. These are connected with each other via the host bus 907 including an internal bus such as a CPU bus or the like. Note that the sound analysis unit 101, the language analysis unit 107, the context analysis unit 109, and the output control unit 111 described above with reference to FIG. 2 can be realized by, for example, the CPU 901.

The host bus 907 is connected to the external bus 911 such as a PCI (Peripheral Component Interconnect/Interface) bus via the bridge 909. Additionally, the input device 915, the output device 917, the storage device 919, the drive 921, the connection port 923, and the communication device 925 are connected to the external bus 911 via the interface 913.

The input device 915 is an operation mechanism operated by a user, such as a mouse, a keyboard, a touch panel, buttons, a switch, a lever, or a pedal. Also, the input device 915 may be a remote control mechanism (a so-called remote control) using, for example, infrared light or other radio waves, or may be an external connection device 929 such as a mobile phone or a PDA conforming to the operation of the information processing device 900. Furthermore, the input device 915 generates an input signal based on, for example, information which is input by a user with the above operation mechanism, and includes an input control circuit for outputting the input signal to the CPU 901. The user of the information processing device 900 can input various data to the information processing device 900 and can instruct the information processing device 900 to perform processing by operating the input device 915. Note that the input unit 310 described above with reference to FIG. 4 can be realized by, for example, the input device 915.

The output device 917 includes a device capable of visually or audibly notifying acquired information to a user. Examples of such device include display devices such as a CRT display device, a liquid crystal display device, a plasma display device, an EL display device and lamps, audio output devices such as a speaker and a headphone, a printer, and the like. For example, the output device 917 outputs a result obtained by various processes performed by the information processing device 900. More specifically, the display device displays, in the form of texts or images, a result obtained by various processes performed by the information processing device 900. On the other hand, the audio output device converts an audio signal including reproduced audio data and sound data into an analog signal, and outputs the analog signal. Note that the output unit 330 described above with reference to FIG. 6 can be realized by, for example, the output device 917.

The storage device 919 is a device for storing data configured as an example of a storage unit of the information processing device 900. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, and various data.

The drive 921 is a reader/writer for recording medium, and is embedded in the information processing device 900 or attached externally thereto. The drive 921 reads information recorded in the attached removable recording medium 927 such as a magnetic disk, an optical disc, a magneto-optical disk, or a semiconductor memory, and outputs the read information to the RAM 905. Furthermore, the drive 921 can write record in the attached removable recording medium 927 such as a magnetic disk, an optical disc, a magneto-optical disk, or a semiconductor memory. The removable recording medium 927 is, for example, a DVD medium, an HD-DVD medium, or a Blu-ray (a registered trademark) medium. In addition, the removable recording medium 927 may be a CompactFlash (CF; a registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing device 900. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (a registered trademark) (High-Definition Multimedia Interface) port, and the like. By the external connection device 929 connecting to this connection port 923, the information processing device 900 directly obtains various types of data from the external connection device 929 and provides various types of data to the external connection device 929.

The communication device 925 is a communication interface including, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 includes a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing device 900 included in the information processing system 1 according to the embodiment of the present disclosure has been shown. Each of the structural elements described above may be configured using a general-purpose material, or may be implemented by hardware dedicated to the function of each structural element. Accordingly, the hardware configuration to be used can be changed as appropriate according to the technical level at the time of carrying out the present embodiment. Note that, although not shown in FIG. 19, for example, it naturally includes various configurations corresponding to the information processing device 900 included in the information processing system 1 according to the present embodiment.

Note that it is also possible to develop a computer program for realizing the respective functions of the information processing device 900 included in the information processing system 1 according to the present embodiment as discussed above, and implement the computer program in a personal computer or the like. In addition, a computer-readable recording medium storing such a computer program may also be provided. The recording medium may be a magnetic disk, an optical disc, a magneto-optical disk, or flash memory, for example. Furthermore, the above computer program may also be delivered via a network, for example, without using a recording medium. In addition, the number of computers causing the computer program to be executed is not particularly limited. For example, the computer program may be executed in cooperation of a plurality of computers (e.g., a plurality of servers or the like). Note that a single computer or a plurality of cooperating computers is also referred to as "computer system."

6. Application Examples

Next, application examples of the information processing system according to the present embodiment will be described. The information processing system according to each embodiment of the present disclosure can be applied to a system and a device to which information is input via a voice. As a specific example, the information processing system according to the present embodiment can also be applied to information processing devices such as smartphones, tablet terminals, personal computers (PCs), and the like. In this case, for example, such an information processing device may be configured as the above-described input/output device 30 or a device including the input/output device 30 and the information processing device 10 in an integrated manner.

In addition, as another example, the information processing system according to the present embodiment may also be applied to an in-vehicle system such as a so-called car navigation system. In addition, the information processing system according to the present embodiment may also be applied to so-called smart home appliances.

In addition, the above-described application examples are merely examples, and examples to which the information processing system according to the present embodiment can be applied are not particularly limited as long as they are systems or devices to which information can be input through a voice.

The application examples of the information processing system according to the present embodiment have been described above.

7. Conclusion

The preferred embodiment (s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present disclosure nay also be configured as below.

(1)

An information processing device, including:
an acquiring unit configured to acquire context information in a period related to collection of a voice; and
a control unit configured to cause a predetermined output unit to output output information related to the collection of the voice in a mode corresponding to the acquired context information.

(2)

The information processing device according to (1), in which the control unit causes the output unit to notify of notification information as the output information in a mode corresponding to a type of process which is executed in accordance with the context information and uses the voice as an input.

(3)

The information processing device according to (2), in which the control unit controls a search range for converting the collected voice into character information in accordance with the context information.

(4)

The information processing device according to (2), in which the control unit controls a parameter related to recording of the collected voice in accordance with the context information.

(5)

The information processing device according to (1), in which the acquiring unit acquires accuracy information related to accuracy of a voice recognition process for the collected voice, and
the control unit causes the output unit to output character information into which the voice is converted as the output information in a mode corresponding to the context information corresponding to the collected voice and the accuracy information corresponding to the voice.

(6)

The information processing device according to (5), in which the control unit causes the output unit to output each of one or more pieces of the character information into which the voice is converted in a mode based on a comparison result of accuracy information corresponding to the character information and a threshold value, and
the control unit controls the threshold value on a basis of the context information.

(7)

The information processing device according to (6), in which the control unit causes the output unit to output the character information in which the accuracy information is equal to or less than the threshold value among the one or more pieces of character information into which the voice is converted as character information indicating a pronunciation of a corresponding voice (8)

The information processing device according to (6), in which the control unit causes the output unit to output the character information in which the accuracy information is equal to or less than the threshold value among the one or more pieces of character information into which the voice is converted as character information of an original form or a singular form.

(9)

The information processing device according to (6), in which, in a case in which the accuracy information of at least some pieces of character information among the one or more pieces of character information into which the voice is converted is less than or equal to the threshold value, the control unit converts the one or more pieces of character information into a voice, and causes the output unit to output the voice.

(10)

The information processing device according to (6), in which the context information includes information related to a degree of attention of a user related to checking of the character information into which the voice is converted, and the control unit performs control such that the threshold value increases as the attention decreases.

(11)

The information processing device according to (10), in which, in a case in which the attention is lower than the threshold value, the control unit causes a predetermined output unit to output the character information as a voice.

(12)

The information processing device according to any one of (5) to (11), in which the control unit presents at least some pieces of the character information presented in a predetermined mode among one or more pieces of the character information into which the voice is converted to be identifiable from the character information presented in a mode different from the predetermined mode.

(13)

The information processing device according to any one of (1) to (12), in which the context information includes information related to a state of an environment in which the voice is collected.

(14)

The information processing device according to any one of (1) to (13), in which the context information includes information related to a state of input information or an input situation of the input information.

(15)

The information processing device according to any one of (1) to (14), in which the context information includes information related to a mode of speech of the voice.

(16)

The information processing device according to any one of (1) to (15), in which the context information includes information related to a state of a user who speaks the voice.

(17)

The information processing device according to any one of (1) to (16), in which the acquiring unit acquires a detection result of the voice included in a collected sound, and the control unit causes a predetermined output unit to notify of notification information on a basis of the detection result of the voice at least before information based on a result of a voice recognition process for the voice is presented and to output the output information after the notification information is notified of.

(18)

An information processing device, including:

a transmitting unit configured to transmit context information in a period related to collection of a voice acquired by a predetermined acquiring unit to an external device; and an output unit configured to present output information related to the collection of the voice transmitted from the external device in a mode corresponding to the context information.

(19)

An information processing method, including, by a computer system:

acquiring context information in a period related to collection of a voice; and causing a predetermined output unit to output output information related to the collection of the voice in a mode corresponding to the acquired context information.

(20)

An information processing method, including, by a computer system:

transmitting context information in a period related to collection of a voice acquired by a predetermined acquiring unit to an external device; and presenting output information related to the collection of the voice transmitted from the external device in a mode corresponding to the context information.

(21)

An information processing device, including:

an acquiring unit configured to acquire a detection result of a voice included in a collected sound; and a control unit configured to cause a predetermined output unit to notify of notification information on a basis of the detection result of the voice at least before information based on a result of a voice recognition process for the voice is presented.

(22)

The information processing device according to (21), in which first character information is acquired as information based on a result of a voice recognition process for the voice after acquiring a detection result of the voice; and the control unit causes the predetermined output unit to output the first character information before second character information based on a result of a natural language process for the first character information is presented.

(23)

An information processing device, including:

a transmitting unit configured to transmit a collection result of a sound by a predetermined sound collection unit to an external device; and an output unit configured to notify of notification information on a basis of control corresponding to a detection result of a voice included in the sound at least before information based on a result of a voice recognition process for the voice included in the sound transmitted from the external device is presented.

(24)

An information processing method, including, by a computer system:

acquiring a detection result of a voice included in a collected sound; and causing a predetermined output unit to notify of notification information on a basis of the detection result of the voice at least before information based on a result of a voice recognition process for the voice is presented.

(25)

An information processing method, including, by a computer system:

transmitting a collection result of a sound by a predetermined sound collection unit to an external device; and notifying of notification information on a basis of a detection result of a voice included in the sound at least before information based on a result of a voice recognition process for the voice transmitted from the external device is presented.

REFERENCE SIGNS LIST 1 information processing system
10 information processing device
101 sound analysis unit
103 voice detecting unit
105 voice recognition processing unit
107 language analysis unit
109 context analysis unit
111 output control unit
30 input/output device
310 input unit
311 sound collection unit
313 sensing unit
315 operation unit
330 output unit
331 display unit
333 sound output unit

The invention claimed is:

1. An information processing device, comprising:
an acquiring unit configured to acquire context information in a period related to collection of a voice, the context information including information of a speed of speech; and
a control unit configured to cause a predetermined output unit to output output information related to the collection of the voice in a mode corresponding to the acquired context information,
wherein the mode corresponding to the acquired context information is a speed-emphasized mode or an accuracy-emphasized mode, and
wherein the acquiring unit, the control unit, and the predetermined output unit are each implemented via at least one processor.

2. The information processing device according to claim 1, wherein the control unit causes the output unit to notify of notification information as the output information in a mode corresponding to a type of process which is executed in accordance with the context information and uses the voice as an input.

3. The information processing device according to claim 2, wherein the control unit controls a search range for converting the collected voice into character information in accordance with the context information.

4. The information processing device according to claim 2, wherein the control unit controls a parameter related to recording of the collected voice in accordance with the context information.

5. The information processing device according to claim 1, wherein the acquiring unit acquires accuracy information related to accuracy of a voice recognition process for the collected voice, and
the control unit causes the output unit to output character information into which the voice is converted as the output information in a mode corresponding to the context information corresponding to the collected voice and the accuracy information corresponding to the voice.

6. The information processing device according to claim 5, wherein the control unit causes the output unit to output each of one or more pieces of the character information into which the voice is converted in a mode based on a comparison result of accuracy information corresponding to the character information and a threshold value, and
the control unit controls the threshold value on a basis of the context information.

7. The information processing device according to claim 6, wherein the control unit causes the output unit to output the character information in which the accuracy information is equal to or less than the threshold value among the one or more pieces of character information into which the voice is converted as character information indicating a pronunciation of a corresponding voice.

8. The information processing device according to claim 6, wherein the control unit causes the output unit to output the character information in which the accuracy information is equal to or less than the threshold value among the one or more pieces of character information into which the voice is converted as character information.

9. The information processing device according to claim 6, wherein the context information indicates a degree of attention of a user related to checking of the character information into which the voice is converted, in which an increased speed of speech indicates an increased degree of attention or in which the location being on the periphery of where character information is output indicates a decreased degree of attention, and
the control unit performs control such that the threshold value increases as the attention decreases.

10. The information processing device according to claim 9, wherein, in a case in which the attention is lower than the threshold value, the control unit causes a predetermined output unit to output the character information as a voice.

11. The information processing device according to claim 5, wherein the control unit presents at least some pieces of the character information presented in a predetermined mode among one or more pieces of the character information into which the voice is converted to be identifiable from the character information presented in a mode different from the predetermined mode.

12. The information processing device according to claim 1, wherein the context information includes information related to a state of an environment in which the voice is collected.

13. The information processing device according to claim 1, wherein the acquiring unit acquires a detection result of the voice included in a collected sound, and
the control unit causes a predetermined output unit to notify of notification information on a basis of the detection result of the voice at least before information based on a result of a voice recognition process for the voice is presented and to output the output information after the notification information is notified of.

14. An information processing device, comprising:
a transmitting unit configured to transmit context information in a period related to collection of a voice acquired by a predetermined acquiring unit to an external device, the context information including information of a speed of speech; and
an output unit configured to present output information related to the collection of the voice transmitted from the external device in a mode corresponding to the context information,
wherein the mode corresponding to the context information is a speed-emphasized mode or an accuracy-emphasized mode, and
wherein the transmitting unit and the output unit are each implemented via at least one processor.

15. An information processing method, comprising, by a computer system:
acquiring context information in a period related to collection of a voice, the context information including information of a speed of speech; and
causing a predetermined output unit to output output information related to the collection of the voice in a mode corresponding to the acquired context information,
wherein the mode corresponding to the acquired context information is a speed-emphasized mode or an accuracy-emphasized mode.

16. An information processing method, comprising, by a computer system:
transmitting context information in a period related to collection of a voice acquired by a predetermined acquiring unit to an external device, the context information including information of a speed of speech; and
presenting output information related to the collection of the voice transmitted from the external device in a mode corresponding to the context information,
wherein the mode corresponding to the acquired context information is a speed-emphasized mode or an accuracy-emphasized mode.

17. The information processing device according to claim 1, wherein:
the acquiring unit is further configured to acquire a detection result of a voice included in a collected sound; and
the control unit is further configured to cause the predetermined output unit to notify of notification information on a basis of the detection result of the voice at least before information based on a result of a voice recognition process for the voice is presented.

18. The information processing device according to claim 14, wherein:
the transmitting unit is further configured to transmit a collection result of a sound by a predetermined sound collection unit to an external device; and
the output unit is further configured to notify of notification information on a basis of control corresponding to a detection result of a voice included in the sound at least before information based on a result of a voice recognition process for the voice included in the sound transmitted from the external device is presented.

19. The information processing method according to claim 15, further comprising, by a computer system:
acquiring a detection result of a voice included in a collected sound; and
causing a predetermined output unit to notify of notification information on a basis of the detection result of the voice at least before information based on a result of a voice recognition process for the voice is presented.

20. The information processing method according to claim 16, further comprising, by a computer system:
transmitting a collection result of a sound by a predetermined sound collection unit to an external device; and
notifying of notification information on a basis of a detection result of a voice included in the sound at least before information based on a result of a voice recognition process for the voice transmitted from the external device is presented.

* * * * *